(12) United States Patent
Park et al.

(10) Patent No.: US 12,436,582 B2
(45) Date of Patent: Oct. 7, 2025

(54) HEAT RADIATING MEMBER AND ELECTRONIC DEVICE INCLUDING SAME

(71) Applicant: SAMSUNG ELECTRONICS CO., LTD., Suwon-si (KR)

(72) Inventors: Yunjeong Park, Suwon-si (KR); Kyungha Koo, Suwon-si (KR); Dongku Kang, Suwon-si (KR); Jihong Kim, Suwon-si (KR); Haein Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 603 days.

(21) Appl. No.: 17/862,205

(22) Filed: Jul. 11, 2022

(65) Prior Publication Data

US 2023/0008679 A1 Jan. 12, 2023

Related U.S. Application Data

(63) Continuation of application No. PCT/KR2022/010063, filed on Jul. 11, 2022.

(30) Foreign Application Priority Data

Jul. 9, 2021 (KR) .................. 10-2021-0090398

(51) Int. Cl.
*H05K 7/20* (2006.01)
*G02B 27/01* (2006.01)
*G06F 1/20* (2006.01)

(52) U.S. Cl.
CPC ......... *G06F 1/203* (2013.01); *G02B 27/0176* (2013.01); *H05K 7/20509* (2013.01); *G02B 2027/0178* (2013.01)

(58) Field of Classification Search
None
See application file for complete search history.

(56) References Cited

U.S. PATENT DOCUMENTS

| 11,376,554 B2* | 7/2022 | Tezuka | ................ | B29D 99/005 |
| 11,892,709 B2* | 2/2024 | Huang | .................. | G02C 11/00 |

(Continued)

FOREIGN PATENT DOCUMENTS

| CN | 107870423 | 4/2018 |
| CN | 208444234 | 1/2019 |

(Continued)

OTHER PUBLICATIONS

Search Report and Written Opinion dated Oct. 20, 2022 issued in International Patent Application No. PCT/KR2022/010063.

(Continued)

*Primary Examiner* — Courtney L Smith
(74) *Attorney, Agent, or Firm* — Nixon & Vanderhye P.C.

(57) ABSTRACT

Various embodiments of the disclosure relate to a heat radiating structure and an electronic device including the same. According to various embodiments of the disclosure, it is possible to provide an electronic device including: a housing including a first surface facing a first direction, a second surface facing a second direction opposite to the first direction, and a third surface enclosing an internal space between the first surface and the second surface, wherein at least one portion of the third surface faces a third direction different from the first direction and the second direction, wherein a first opening is formed in the first surface, and a second opening is formed in the third surface; a substrate disposed in the internal space; an electronic component disposed on at least one surface of the substrate; and a mesh member disposed in the internal space and disposed adjacent to the first opening and the second opening.

20 Claims, 18 Drawing Sheets

(56) References Cited

U.S. PATENT DOCUMENTS

| | | | | |
|---|---|---|---|---|
| 2007/0046890 A1* | 3/2007 | Chen | ...................... | G02C 11/00 |
| | | | | 351/120 |
| 2010/0079356 A1* | 4/2010 | Hoellwarth | ............ | H04B 1/385 |
| | | | | 345/8 |
| 2013/0208229 A1* | 8/2013 | Polegato Moretti | ..... | G02C 5/14 |
| | | | | 351/62 |
| 2016/0212886 A1 | 7/2016 | Nikkhoo | | |
| 2020/0137471 A1* | 4/2020 | Yee | ......................... | H04M 1/03 |
| 2020/0379257 A1 | 12/2020 | Lee et al. | | |
| 2021/0092499 A1* | 3/2021 | Fukushima | ........... | G06F 1/1688 |

FOREIGN PATENT DOCUMENTS

| | | |
|---|---|---|
| CN | 110716315 | 1/2020 |
| CN | 111983808 | 11/2020 |
| JP | 2017-063322 | 3/2017 |
| JP | 2018-035947 | 3/2018 |
| JP | 2021-051214 | 4/2021 |
| KR | 10-2014-0059034 | 5/2014 |
| KR | 10-2015-0083256 | 7/2015 |
| KR | 10-2017-0030104 | 3/2017 |
| KR | 10-2020-0137813 | 12/2020 |

OTHER PUBLICATIONS

Korean Office Action dated Jun. 10, 2025 for KR Application No. 10-2021-0090398.

* cited by examiner

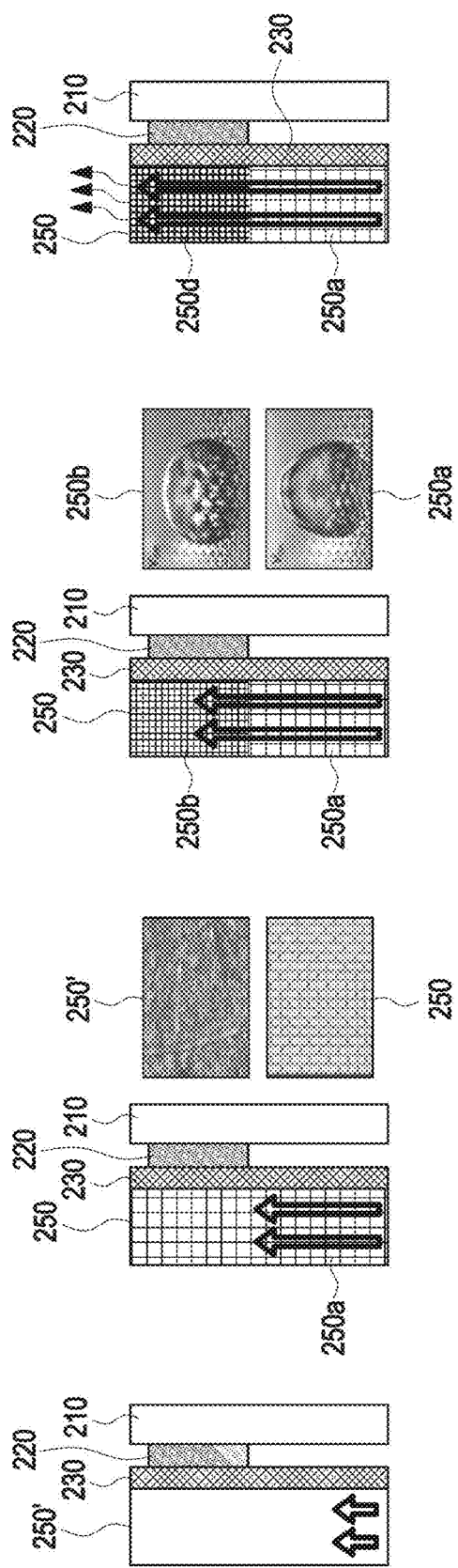

HEAT RADIATING MEMBER AND ELECTRONIC DEVICE INCLUDING SAME

CROSS-REFERENCE TO RELATED APPLICATIONS

This application is a continuation of International Application No. PCT/KR2022/010063 designating the United States, filed on Jul. 11, 2022, in the Korean Intellectual Property Receiving Office and claiming priority to Korean Patent Application No. 10-2021-0090398, filed on Jul. 9, 2021, in the Korean Intellectual Property Office, the disclosures of which are incorporated by reference herein in their entireties.

BACKGROUND

Field

The disclosure relates to a heat radiating structure and an electronic device including the same.

Description of Related Art

Recently, electronic devices such as portable terminals having novel functions have been developed at a rapid pace, and as the distribution of the electronic devices has been expanded, the proportion of electronic devices, such as portable terminals, in people's live is gradually increasing. In addition, with respect to portable terminals such as smartphones, which have become popularized due to the development of mobile communication technology, demand for miniaturization and weight reduction is increasing in order to maximize and/or improve the portability and convenience of users, and integrated electrical components are being mounted in spaces that are gradually becoming smaller, in order to achieve high performance.

Portable terminals such as smartphones have been reduced in size and weight and developed into wearable forms that can be worn on a portion of a human body such as a wrist or a head. For example, a head-mounted device, smartglasses, a smartwatch (or a smartband), a contact lens-type device, a ring-type device, a glove-type device, a shoe-type device, or a clothing-type device may be worn on a user's body. Such a body-worn electronic device can be easily carried and improved in user accessibility.

As a wearable device that can be mounted on a head (hereinafter, referred to as a "head-mounted device"), smartglasses are disclosed in which a display member (e.g., a lens unit) is mounted on a glasses frame structure, and a virtual object is capable of being processed through the display member. The smartglasses may include, for example, virtual reality (VR) glasses or augmented reality (AR) glasses.

Smartglasses, which display and control a virtual object thereon, may be equipped with various components such as a camera, a driver for driving the camera, an optical output device for outputting the virtual object to the display member, a processor for image processing, and a power management module (e.g., a PMIC). However, the above-described components consume power and generate heat while performing functions.

Smartglasses are used in close contact with a user's skin, and thus the skin may be in direct and prolonged contact with the heat generated from the components. Insufficient thermal management of the electronic device may give a user displeasure due to high temperature and may cause damage such as low-temperature burn to the user.

SUMMARY

Embodiments of the disclosure provide a structure that provides a heat radiating structure that is capable of efficiently dissipating heat generated by an electronic device (e.g., smartglasses) and provides a structure that blocks heat to a portion in contact with a user's skin.

Embodiments of the disclosure provide a structure capable of efficiently absorbing and/or discharging sweat that is generated from a user by heat generated by an electronic device.

The problems to be addressed in the disclosure are not limited to the above-mentioned problems, and may be variously expanded without departing from the spirit and scope of the disclosure.

According to an embodiment of the disclosure, it is possible to provide an electronic device including: a housing including a first surface facing a first direction, a second surface facing a second direction opposite to the first direction, and a third surface enclosing an internal space between the first surface and the second surface, wherein at least one portion of the third surface faces a third direction different from the first direction and the second direction, wherein a first opening is formed in the first surface, and a second opening is formed in the third surface; a substrate disposed in the internal space; an electronic component disposed on at least one surface of the substrate; and a mesh member disposed in the internal space adjacent to the first opening and the second opening.

According to an embodiment of the disclosure, it is possible to provide wearable electronic device including: a housing including a first surface facing a first direction and facing a portion of a user's body, a second surface facing a second direction opposite to the first direction, and a third surface enclosing an internal space between the first surface and the second surface, wherein at least one portion of the third surface faces a third direction different from the first direction and the second direction, wherein a first opening is formed in the first surface, and a second opening is formed in the third surface; a substrate disposed in the internal space; an electronic component disposed on at least one surface of the substrate; a heat spreading structure disposed between the electronic component and a member, the mesh member disposed in the internal space and adjacent to the first opening and the second opening configured to spread moisture to the second opening based on the moisture being introduced from the first opening; and a separation membrane disposed between the member and the electronic component to reduce penetration of moisture into the electronic component.

According to an embodiment of the disclosure, it is possible to provide a wearable electronic device including: a housing including at least one opening; a substrate; an electronic component disposed on at least one surface of the substrate; a heat spreading portion disposed adjacent to the electronic component; and a sweat absorbing and spreading portion disposed adjacent the opening.

Using the heat radiating structure according to various example embodiments of the disclosure and an electronic device including the same, it is possible to effectively transfer high-temperature heat generated from various electronic components disposed inside the electronic device to a relatively low-temperature portion.

The wearable electronic device according to various example embodiments of the disclosure is capable of providing a comfortable environment for use by absorbing and effectively evaporating sweat flowing from a user's skin by including a member made of a mesh material.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 10A. 10B. 10C and 10D are a diagrams illustrating moving speeds of liquid depending on the materials of a member, according to various embodiments;

DETAILED DESCRIPTION

Figure 1:
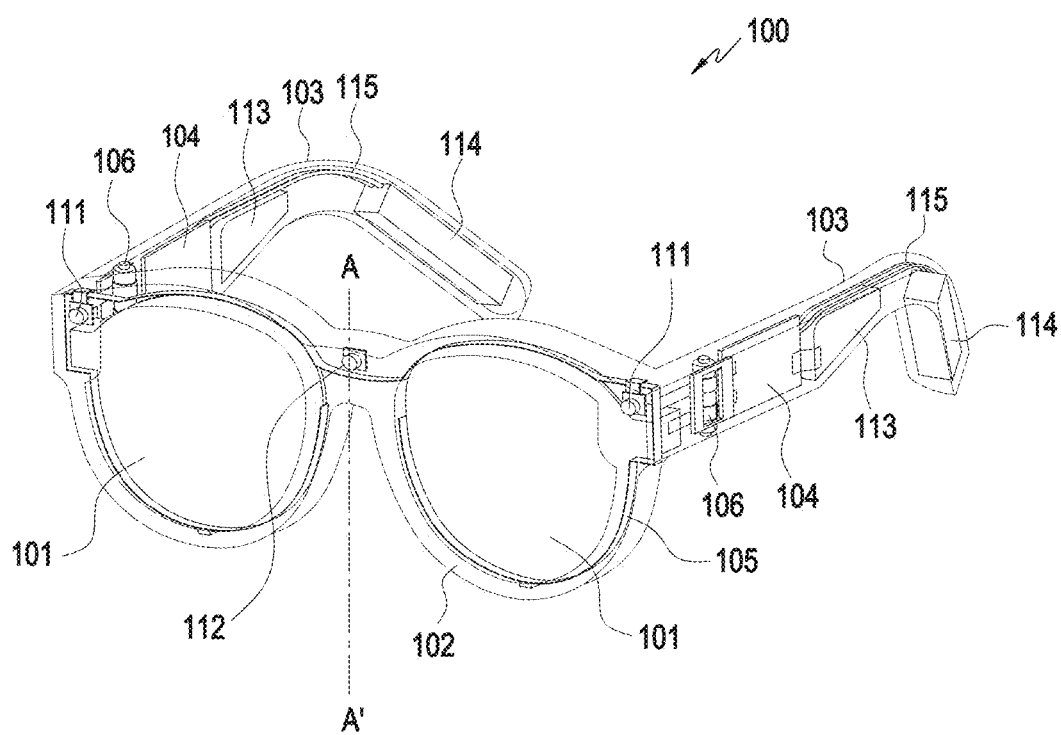
FIG. 1 is a perspective view of an electronic device according to various embodiments.

FIG. 1 is a perspective view illustrating an electronic device 100 according to various embodiments.

A heat radiating structure according to various embodiments of the disclosure may be mounted on the electronic device 100. In FIG. 1 and the drawings to be described below, as an example of the electronic device 100 to which the heat radiating structure of the disclosure is applied, a wearable electronic device 100 in the form of glasses (e.g., AR glasses) is illustrated by way of non-limiting example, but it should be noted that the type of electronic device is not limited thereto. For example, the electronic device according to various embodiments of the disclosure may also be applied to a watch-type wearable electronic device, an earbud-type wearable electronic device, or other electronic devices such as a smartphone, as well as other wearable electronic devices such as VR glasses, A user may visually recognize a surrounding object or environment while wearing the wearable electronic device 100. The wearable electronic device 100 may acquire and/or recognize a visual image about an object or environment in a direction that the user looks at or the wearable electronic device 100 is oriented using a camera module 111, and may acquire an/or recognize information about the object or environment using a sensor module 112 (e.g., a proximity sensor). In addition, the wearable electronic device 100 may receive information about an object or environment from an external electronic device (or a server) via a network. In an embodiment, the wearable electronic device 100 may provide the received information about the object or environment to the user in an acoustic or visual form. For example, the wearable electronic device 100 may provide the received information about the object or environment to the user via the display members 101 in a visual form using a display module. By implementing information about an object or environment in a visual form (hereinafter, referred to as, for example, an "augmented reality object") and combining the augmented reality object with a real image (or video) of the user's surrounding environment, the wearable electronic device 100 may implement augmented reality. The display member 101 may provide the user with information about an object or environment around the user by outputting a screen in which an augmented reality object is added to an actual image (or video) of the user's surrounding environment.

In the following detailed description, "a state or location in which an electronic device or a predetermined component of the electronic device faces the user's face" may be variously mentioned, but it should be noted that this is based on the state in which the user wears the wearable electronic device 100.

According to various embodiments, the wearable electronic device 100 may include at least one display member (e.g., glass) 101, lens frame 102, and wearing member (e.g., stem) 103. The display member 101, the lens frame 102, and the wearing member 103 may be symmetrically disposed with reference to a virtual line A-A'.

There may be provided a pair of display members 101 including a first display member and a second display member, which may be disposed to correspond to the user's right eye and left eye, respectively, in the state in which the wearable electronic device 100 is worn on the user's body. According to various embodiments, the display member 101 is a component provided in order to provide visual information to the user, and may include, for example, a lens, a display, and/or a module mounted with a touch circuit. Each of the lens and the display may be formed to be transparent or translucent. As another example, the display member 101 may include a window member, which may be translucent glass or a member of which light transmittance is adjustable as a color concentration thereof is adjusted. As another example, the display member 101 may include a lens including a waveguide, a reflective lens, or the like, and since an image output from a light output device (e.g., a projector) is formed on each lens, it is possible to provide visual information to the user.

According to various embodiments, the lens frame 102 is a structure that at least partially surrounds the edges of the display members 101 in order to at least partially fix the display members 101, and may be supported or positioned on the user's face in the state in which the user wears the wearable electronic device 100. For example, the lens frame 102 may position at least one of the display members 101 to correspond to the user's naked eye. According to an embodiment, the lens frame 102 may serve as a rim of a general eyeglass structure. In an embodiment, at least a portion of the lens frame 102 may include a material having a good heat conductivity, for example, a metal material. The heat-conductive material may be, for example, a metal material, but is not limited thereto. A material having good heat conductivity may be used as a material for manufacturing the lens frame 102 even if the material is not a metal material. The lens frame 102 is a structure substantially exposed to the exterior of the wearable electronic device 100, and may correspond to a housing of the electronic device (e.g., the wearable electronic device 100).

According to various embodiments, the wearable electronic device 100 may include a camera module (e.g., including a camera) 111 and/or a sensor module (e.g., including a sensor) 112. A flexible printed circuit board 105 may electrically connect the camera module 111 and/or the sensor module 103 to a circuit board 104 (e.g., a printed circuit board (PCB), a printed board assembly (PBA), a flexible PCB (FPCB), or a rigid-flexible PCB (RFPCB)) accommodated in a wearing member 103. A processor of the electronic device 100 may recognize an object or environment based on an image acquired through the camera module 111. According to various embodiments, the flexible printed circuit board 105 may extend from the circuit board 104 into the interior of the lens frame 102 across a hinge structure (e.g., including a hinge) 106. According to an embodiment, the flexible printed circuit board 105 may be disposed on at least a portion of the periphery of the display members 101 inside the lens frame 102. For example, the camera module 111 and/or the sensor module 112 may be disposed substantially within the lens frame 102 using the flexible printed circuit board 105, and may be disposed in the vicinity of the display member 101.

According to various embodiments, the wearable electronic device 100 may include wearing members (e.g., stems) 103 corresponding to temples. For example, the wearing member 103 may include a first wearing member and a second wearing member. In an embodiment, the wearing member 103 may be rotatably coupled to the lens frame 102 via hinge structures 106 corresponding to endpieces of the glasses. According to an embodiment, the wearing member 103 may include a housing together with the lens frame 102 or may correspond to a portion of the housing. In the state in which the wearable electronic device 100 is not worn, the user may conveniently carry or store the wearable member 103 by folding the wearing member 103 to overlap the lens frame 102. One portion of the hinge structure 106 may be mounted on the lens frame 102, and the other portion may be received or mounted into the wearing member 103. According to various embodiments, the wearable electronic device 100 may include, in addition to the circuit board 104 positioned in the wearing member 103, other various electronic components, for example, a speaker module (e.g., including a speaker) 113 and/or a battery 114. According to an embodiment, various electronic components accommodated in the wearing member 103 may be mounted on the circuit board 104. For example, at least one electronic component in the form of an integrated circuit chip may be mounted on the circuit board 104, and circuit devices such as a processor, a communication module, a power management module, and/or a memory may be provided in the integrated circuit chip. According to an embodiment, various electronic components accommodated in the wearing member 103 may be disposed on a portion other than the circuit board 104. As an example, the battery 114 may be disposed in an end portion (e.g., a tip portion) of the wearing member 103 other than the circuit board 104, and may be electrically connected to an electronic component (e.g., a power management module) disposed on the circuit board 104 via a circuit board (e.g., the circuit board 104 or a flexible printed circuit board 105), a conductive cable, or a connection member 115.

Figure 2A:
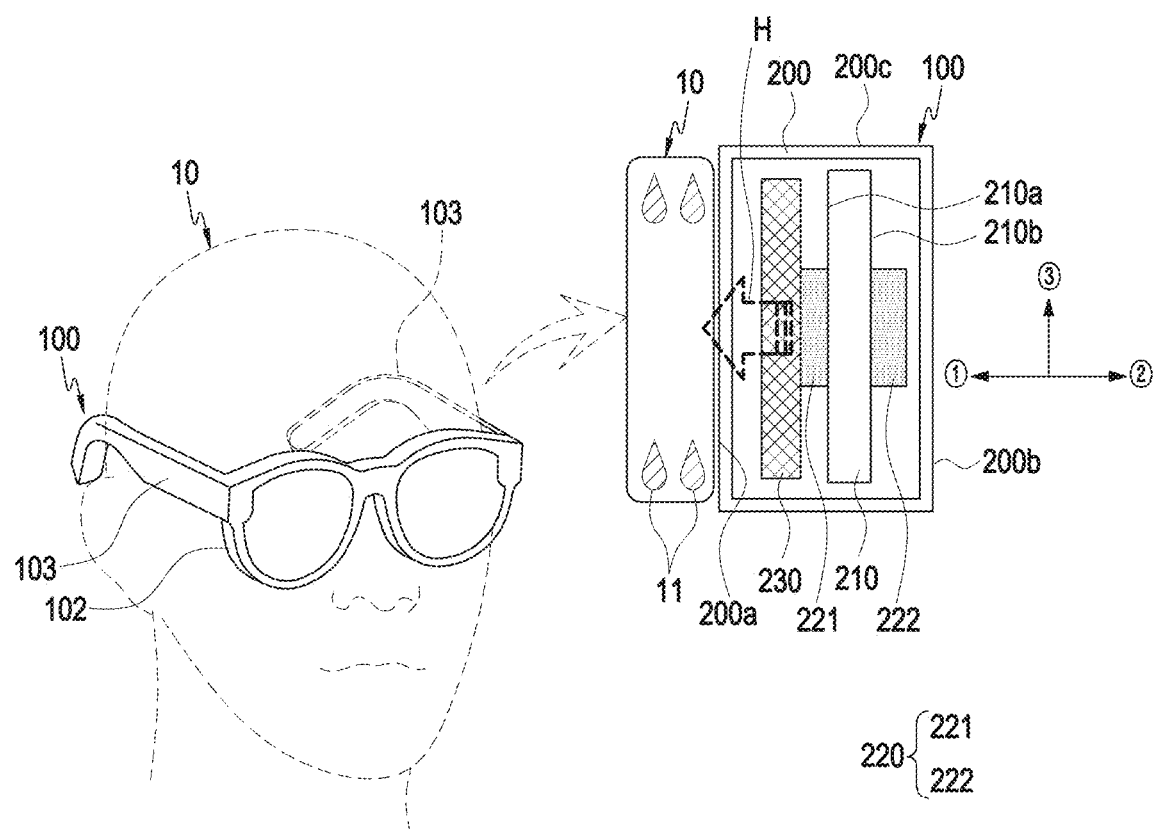
FIG. 2A is a diagram illustrating a state in which a user wears the electronic device, according to various embodiments.

FIG. 2A is a diagram illustrating a state in which a user wears the wearable electronic device 100 according to an embodiment of the disclosure.

In the drawings of FIG. 2A and drawings subsequent thereto, direction component ①, direction component ②, and direction component ③ are illustrated. The direction components ① and ③ may be orthogonal to each other, and the direction components ① and ② may be facing in opposite directions. According to an embodiment, the direction components ① and ③ may form a spatial coordinate system together with a component perpendicular to each of the components ① and ③. Here, the direction component ① may indicate the thickness (or width) direction of the wearable electronic device 100, and the direction component ③ may indicate the height direction of the wearable electronic device 100. In the following description, the direction components ① and ② may refer to first and second directions, respectively. In addition, the direction component ③ may refer to a third direction or a direction opposite to the third direction.

According to various embodiments, when the user 10 wears the wearable electronic device 100, the wearing member 103 may be disposed on a temple portion of the user 10. Since the circuit board 104 (e.g., the circuit board 104 in FIG. 1) and/or various electronic components are disposed in the wearing member 103 of the wearable electronic device 100, high-temperature heat may be generated from the wearable member 103. For example, as an electronic component disposed on at least one surface of the circuit board, for example, at least one integrated circuit chip may be disposed.

According to various embodiments of the disclosure, the wearable electronic device 100 may include a housing 200 including a first surface 200a facing in a first direction (direction component ①), a second surface 200b facing in a second direction (direction component ②) opposite to the first direction, and a third surface 200c facing in a third direction different from the first and second directions and surrounding the internal space between the first surface 200a and the second surface 200b. FIG. 2A illustrates an embodiment in which the third surface 200c is parallel to the direction component ③). However, the disclosure is not necessarily limited thereto, and the third surface 200c may refer to a surface that is facing in a direction opposite to the directional component ③).

In FIG. 2A, each of the first surface 200a, the second surface 200b, and the third surface 200c of the housing 200 is illustrated as a flat surface, but is not necessarily limited thereto. At least one of the first surface 200a, the second surface 200b, and the third surface 200c may include a curved surface. In addition, in the embodiment illustrated in FIG. 2A, the first surface 200a and the third surface 200c are illustrated to be orthogonal to each other, and the second surface 200b and the third surface 200c are illustrated to be orthogonal to each other. However, it should be noted that the surfaces may be formed seamlessly. The housing 200 may refer to a part or all of the frame (e.g., the lens frame 102 of FIG. 1) or the wearing member 103 of the wearable electronic device 100. The first surface 200a facing in the first direction of the electronic device 100 may be defined as a surface that comes into contact with the skin when the user wears the wearable electronic device 100.

A substrate 210 (e.g., the circuit board 104 in FIG. 1) may be disposed inside the housing 200. In addition, an electronic component 220 may be disposed on at least one surface of the substrate 210. According to an embodiment, electronic components 221 and 222 may be respectively disposed on one surface 210a and the other surface 210b of the substrate 210. The electronic components may include, for example, and without limitation, a processor, a communication module, a power management module, or a memory. In addition, a heat spreading structure 230 may be disposed adjacent to the electronic component 221 disposed on one surface 210a of the substrate 210 among the electronic components. The term "adjacent" may include a state in which a certain component is located close to or almost in contact with another element while being spaced apart from the other component by a predetermined distance. In addition, it should be noted that the term "adjacent" includes a state in which a certain component is disposed close to another component, but does not exclude a state in which still another component is disposed between the certain component and the other component. For example, a shield can (not illustrated) may surround the electronic component 221, and a heat spreading structure 230 may be disposed to face the shield can. The heat spreading structure 230 may be a means for radiating high-temperature heat generated inside the housing 200 to a relatively low-temperature location. In various embodiments below, the heat spreading structure 230 may include one or a combination of two or more of a vacuum chamber, a heat pipe, a solid heat radiation sheet (thermal sheet), or a liquid heat radiation paint. Here, heat spreading may include all of various heat energy movement forms, including heat transfer, heat conduction, heat diffusion, and heat radiation.

In the description made with reference to the drawings of FIG. 2A and drawings subsequent thereto, it may be assumed that the wearing member 103 corresponds to the housing 200. As illustrated in FIG. 2A, high-temperature heat (H) is generated inside the wearing member 103 by the electronic components disposed on the circuit board and conducted to the surroundings, and a part of the generated heat energy (H) may be transferred to the user's skin or a portion of the wearing member 103 adjacent to the skin.

According to an embodiment, the wearable electronic device 100 may include a heat spreading structure 230 (e.g., a heat spreader structure) for preventing and/or reducing heat from being concentrated using a large area of the wearable member 103. However, only with this, it may not be possible to significantly lower the high-temperature heat transferred to the skin of the user 10, and this may not be an effective solution to solve the inconvenience of causing the user 10 to generate sweat 11 or the risk of low-temperature burn.

Figure 2B:
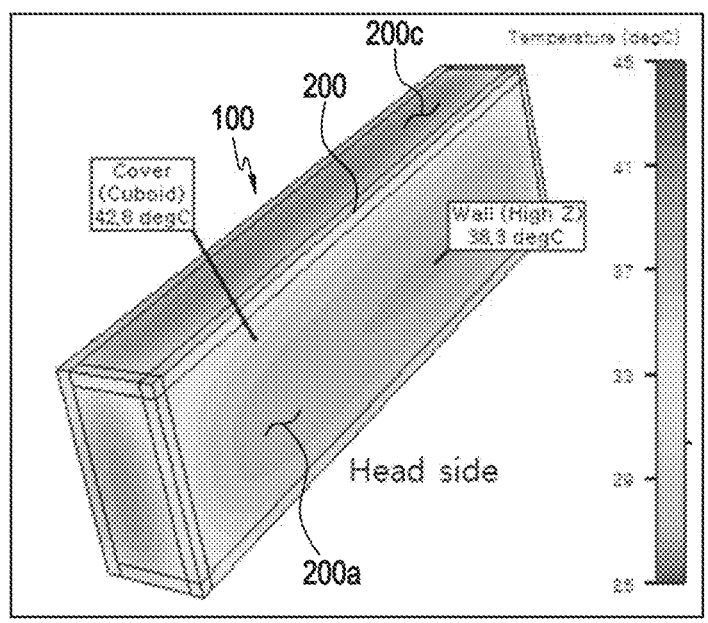
FIG. 2B is a diagram illustrating the surface temperature of an electronic device to which a heat insulating structure is not applied, according to various embodiments.

FIG. 2B is a diagram illustrating the surface temperature of the wearable electronic device 100 to which a heat insulating structure is not applied, according to various embodiments.

Referring to FIGS. 2A and 2B together, by providing a heat spreading structure 230, heat can be evenly spread over the surfaces of the housing 200 of the wearable electronic device 100, but the heat energy remaining on the surfaces of the housing 200 may be excessive to come into contact with the skin of the user 10. For example, it can be seen that the first surface 200a of the housing 200 is still measured as a temperature higher than the average human body temperature (e.g., 38.3 degrees Celsius). Such a high temperature of the surface of the housing 200 may cause sweat 11 to be generated on the skin of the user 10.

Figure 3A:
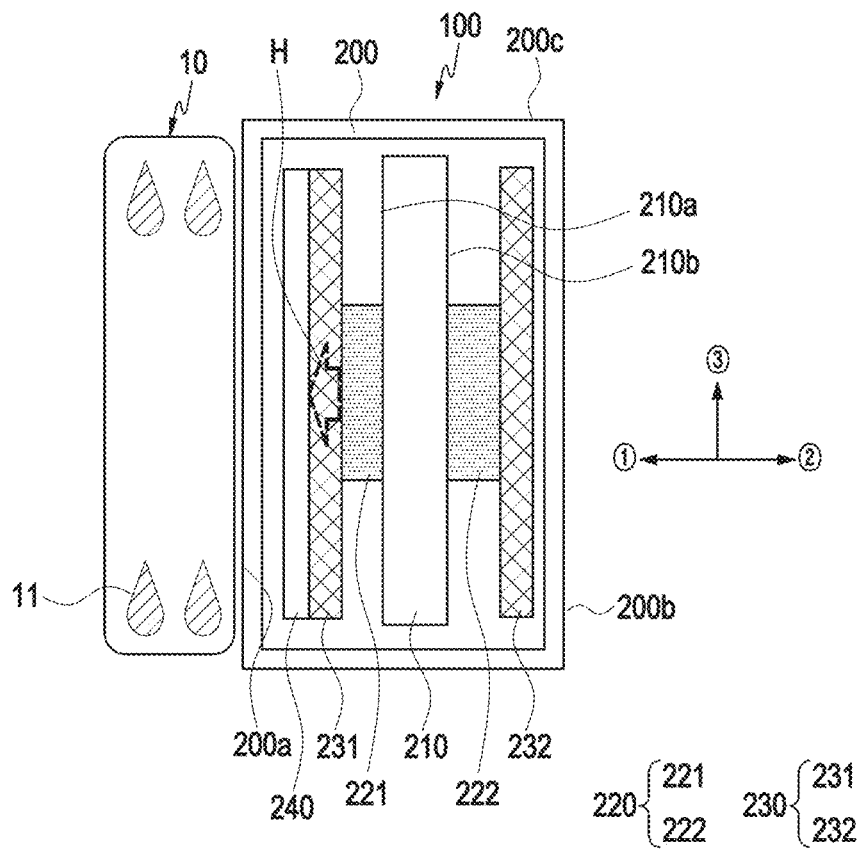
FIG. 3A is a cross-sectional view illustrating an electronic device to which a heat insulating structure is applied, according to various embodiments.

FIG. 3A is a cross-sectional view illustrating a wearable electronic device 100 to which a heat insulating structure is applied, according to various embodiments.

Referring to FIG. 3A, a substrate 210 may be disposed inside the housing 200. In addition, an electronic component 220 may be disposed on at least one surface of the substrate 210. According to an embodiment, electronic components 221 and 222 may be respectively disposed on one surface 210a and the other surface 210b of the substrate 210. In addition, a first heat spreading structure 231 may be disposed adjacent to the electronic component 221 disposed on the one surface 210a of the substrate 210, of the electronic components, and a second heat spreading structure 232 may be disposed adjacent to the electronic component 222 disposed on the other surface 210b disposed on the other surface 210b of the substrate 210. According to the embodiment illustrated in FIG. 3A, the heat spreading structure 230 may be disposed adjacent to each of the first surface 200a and the second surface 200b of the housing 200 to spread the heat inside the housing 200 over each of large surfaces of the housing 200. According to an embodiment, the wearable electronic device 100 may further include a heat insulating structure 240.

According to various embodiments, the heat insulating structure 240 is a means for at least partially blocking the movement of heat (H), for example, poron, cork, magnesium powder, calcium silicate, pearlite, aluminum foil, or a porous refractory material may be applied. The type of the heat insulating structure 240 is not limited and may vary according to embodiments. According to an embodiment, as the heat insulating structure 240, a heat insulating material having a lower heat conductivity than that of air may be used.

By disposing the heat insulating structure 240 between the heat spreading structure 230 and the housing 200, when the user wears the wearable electronic device 100, it is possible to prevent and/or reduce high-temperature heat from being transferred to the user's skin.

Figure 3B:
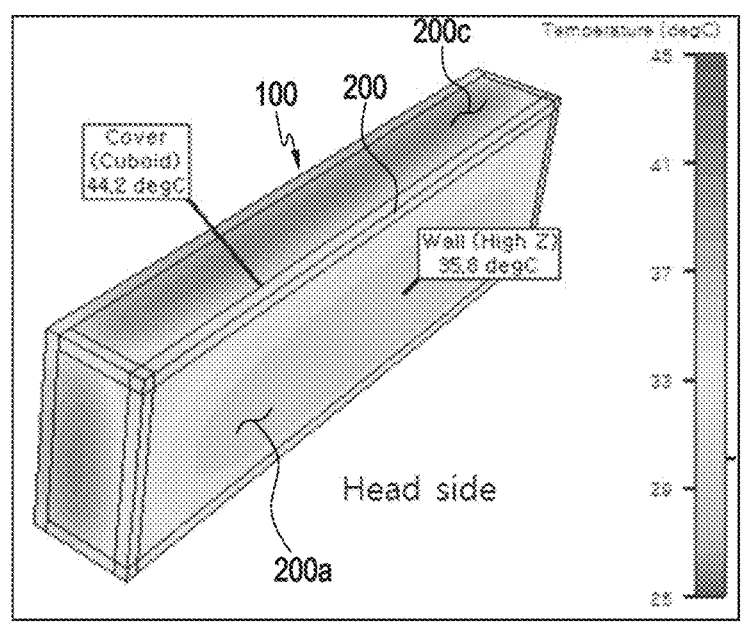
FIG. 3B is a diagram illustrating the surface temperature of an electronic device to which a heat insulating structure is applied, according to various embodiments.

FIG. 3B is a diagram illustrating a surface temperature of the electronic device 100 to which a heat insulating structure (e.g., the heat insulating structure 240 in FIG. 3A) is applied, according to various embodiments.

Referring to FIGS. 3A and 3B together, by providing the heat spreading structure 230, it is possible to cause heat to be evenly spread over the surfaces of the housing 200 of the wearable electronic device 100, and by disposing the heat insulating structure 240 between the first heat spreading structure 231 and the housing 200, it is possible to reduce heat energy remaining on a surface of the housing 200 that comes into contact with the user's skin (e.g., the first surface 200a). For example, in the embodiment to which the heat insulating structure of FIG. 3B is applied, it can be seen that a temperature (e.g., 35.8 degrees Celsius) significantly lower than that in the embodiment in which the heat insulating structure of FIG. 2B is not applied is measured on the first surface 200a of the housing 200. For example, it can be seen that in the case of the third surface 200c of the housing 200, a temperature of 42.8 degrees Celsius is measured in the embodiment to which the heat insulating structure of FIG. 2B is not applied, but a temperature of 44.2 Celsius is measured in the embodiment to which the heat insulating structure of FIG. 3B is applied. In this way, in the embodiment to which the heat insulating structure is applied, it is possible to improve the user's convenience by spreading heat energy to a portion other than the surface (e.g., the first surface 200a) of the housing 200 that comes into contact with the user's skin.

Figure 4A:
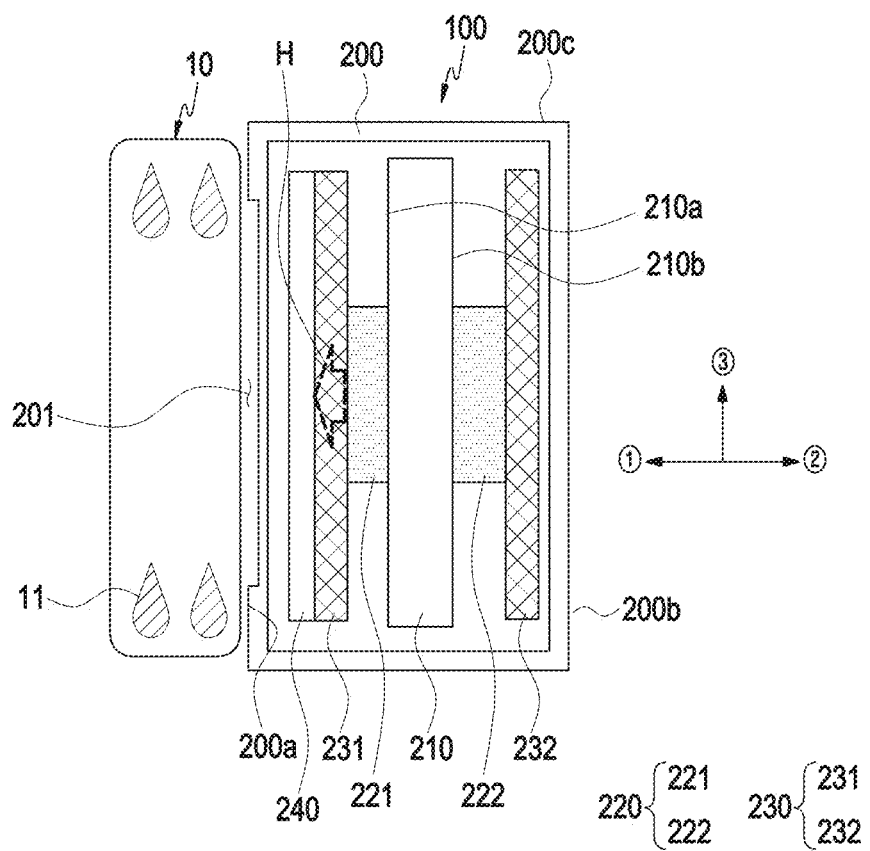
FIG. 4A is a cross-sectional view illustrating an electronic device including a first recess formed in a housing, according to various embodiments.
Figure 4B:
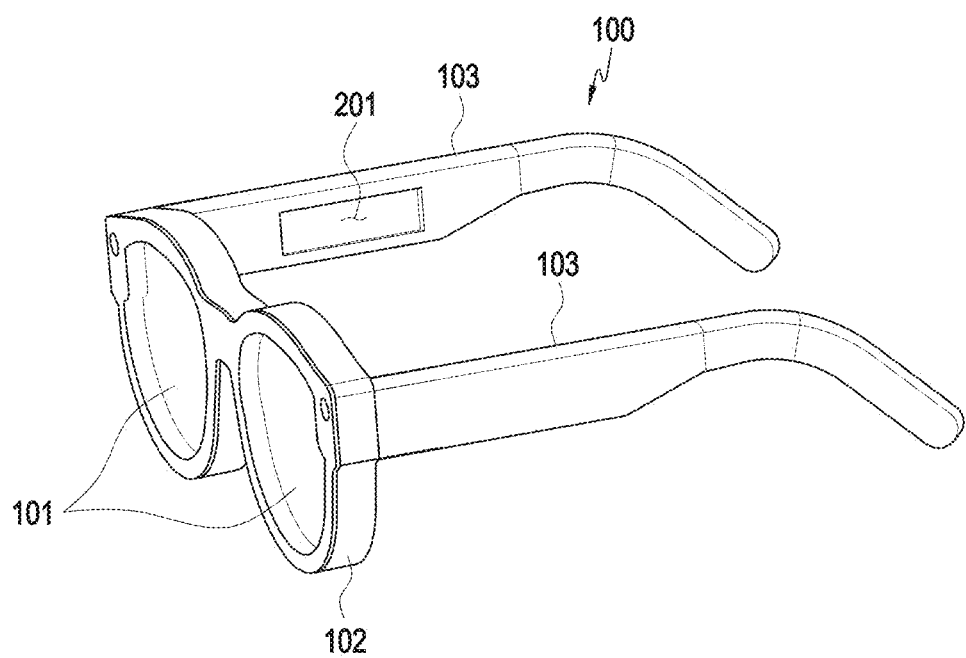
FIG. 4B is a perspective view illustrating an electronic device including a first recess formed in a housing, according to various embodiments.

FIG. 4A is a cross-sectional view illustrating a wearable electronic device 100 in which a first recess 201 is formed in the housing 200 (e.g., the wearing member 103 in FIG. 1), according to various embodiments. FIG. 4B is a perspective view illustrating a wearable electronic device 100 in which a first recess 201 is formed in the housing 200 (e.g., the wearing member 103 in FIG. 1), according to various embodiments. In describing the embodiment of FIGS. 4A and 4B, a description overlapping the description made above with reference to the drawings may not be repeated.

As a means for preventing/reducing the heat generated by the electronic component 220 disposed in the internal space of the wearable electronic device 100 from causing inconvenience to the user, a structure recessed inward compared to other surfaces of the housing 200, for example, a first recess 201, may be formed in one surface of the housing 200 (e.g., the wearing member 103).

Referring to FIGS. 4A and 4B together, the first recess 201 is formed in the first surface 200a of the wearing member 103 that comes into contact with the user's skin. By forming the first recess 201 at a position adjacent to the electronic component (e.g., the electronic component 221) among the surfaces of the housing 200 (e.g., the wearing member 103), it is possible to avoid the direct contact of the user's skin with a heat-generating portion. The first recess 201 may be formed as a single groove in a stepped shape from the first surface 200a of the housing 200 as illustrated in the drawing, but is not necessarily limited thereto. The first recess 201 may be formed as a recess having a size, depth, and width different from those of the first recess 201 illustrated in the drawing. In addition, the first recess 201 may include a plurality of recesses separated from each other.

Figure 5A:
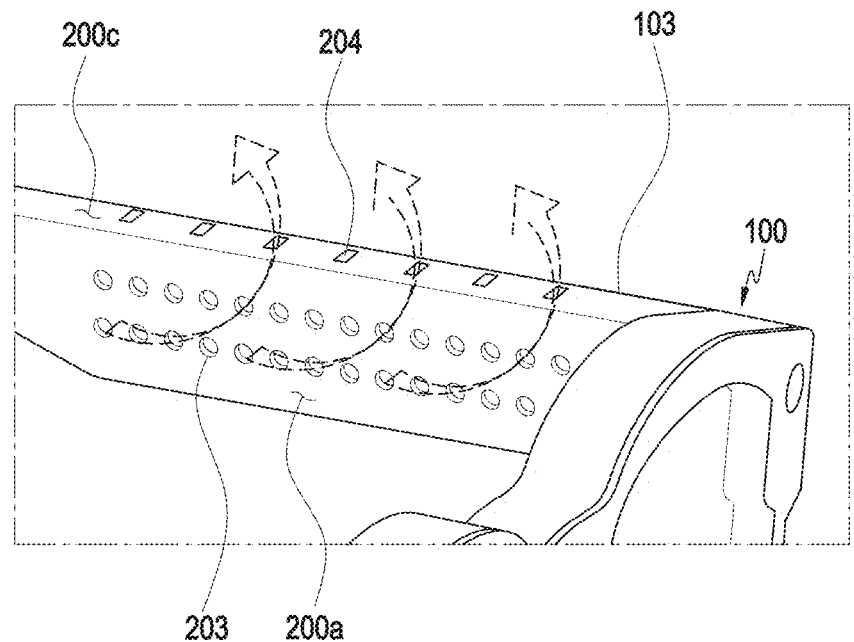
FIG. 5A is a perspective view illustrating an electronic device including a first recess and a second recess formed in a housing, according to various embodiments.
Figure 5B:
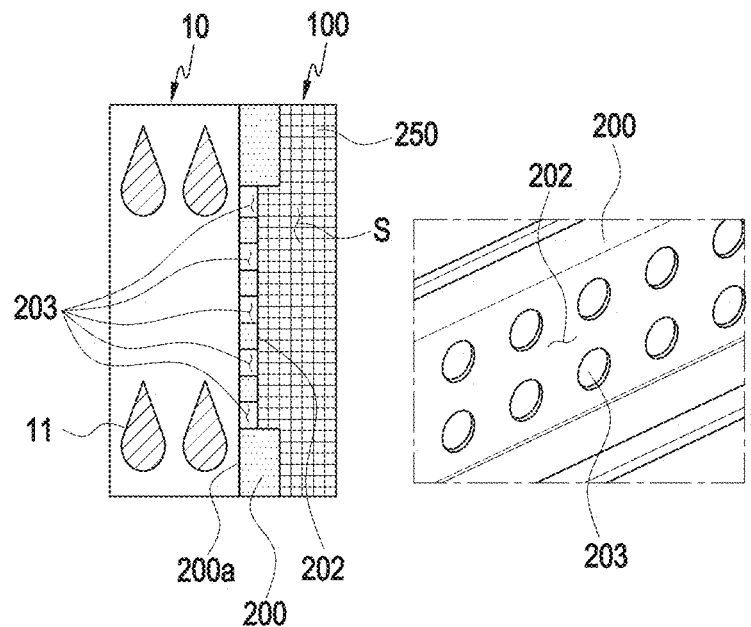
FIG. 5B is an enlarged view illustrating an electronic device including a second recess formed in a housing, according to various embodiments.

FIG. 5A is a perspective view illustrating a wearable electronic device 100 in which a first opening 203 and a second opening 204 are formed in the housing 200 (e.g., the wearing member 103), according to various embodiments. FIG. 5B is an enlarged view illustrating a wearable electronic device 100 in which a second recess 202 is formed inside the housing 200, according to various embodiments.

As another means for preventing/reducing the heat generated by the electronic component 220 disposed in the internal space of the wearable electronic device 100 from causing inconvenience to the user, at least one opening may be formed in the housing 200 (e.g., the wearing member 103). According to an embodiment, the at least one opening may include first openings 203 and second openings 204. According to an embodiment, the first openings 203 may be formed in the first surface 200a of the housing 200, and the second openings 204 may be formed in a surface other than the first surface 200a of the housing 200.

Referring to FIG. 5A, the second openings 204 may be formed in the third surface 200c adjacent to the first surface 200a of the housing 200. In the wearing member 103, the first openings 203 may be formed in the first surface 200a that comes into contact with the user's skin, and the second openings 204 may be formed in the third surface 200c. By forming the first openings 203 and the second openings 204 in the housing 200, a passage through which a fluid may circulate may be formed, thereby enhancing the heat generation performance of the electronic device. For example, a fluid may be introduced through the first openings 203 formed in the housing 200, and the fluid introduced through the first openings 203 may be discharged through the second openings 204. The fluid may be, for example, sweat 11 generated on the skin of the user 10, but may also include air or moisture other than sweat. In the embodiment of FIG. 5A, the second openings 204 are directed upward in the wearing member 103 (e.g., the direction component ③ in FIG. 2A)), but is not necessarily limited thereto. The second openings 204 may be directed downward in the wearing member 103 (e.g., the direction opposite to the direction component ③ in FIG. 2A).

Referring to FIGS. 5A and 5B together, the electronic device 100 may be provided with the first openings 203 to absorb sweat 11 generated from the skin of the user 10. For example, when the wearable electronic device 100 is worn, the sweat 11 may be easily absorbed by forming the first opening 203 in a portion in direct contact with the skin of the user 10.

According to various embodiments of the disclosure, in order to facilitate the absorption and spreading of the sweat 11 introduced through the first openings 203, the electronic device 100 may further include a mesh material member 250 in a space S inside the housing 200. According to an embodiment, the mesh material member 250 may be disposed adjacent to the first openings 203 to spread the sweat 11 introduced into the first openings 203 by a capillary force. According to an embodiment, a second recess 202 may be formed in at least a portion of an inner surface of the first surface 200a of the housing 200 so that the member 250 can absorb the sweat 11 more easily. By forming the second recess 202, as the member 250 is disposed closer to the skin of the user 10, the absorption of the sweat 11 can be facilitated. Here, the shape of the second recess 202 is not limited to the illustrated embodiment, and may be formed in various shapes. For example, it may be formed in a polygonal, circular, or wavy shape.

The mesh material member 250 will be described in detail with reference to FIGS. 6A and 6B and drawings subsequent thereto.

Figure 6A:
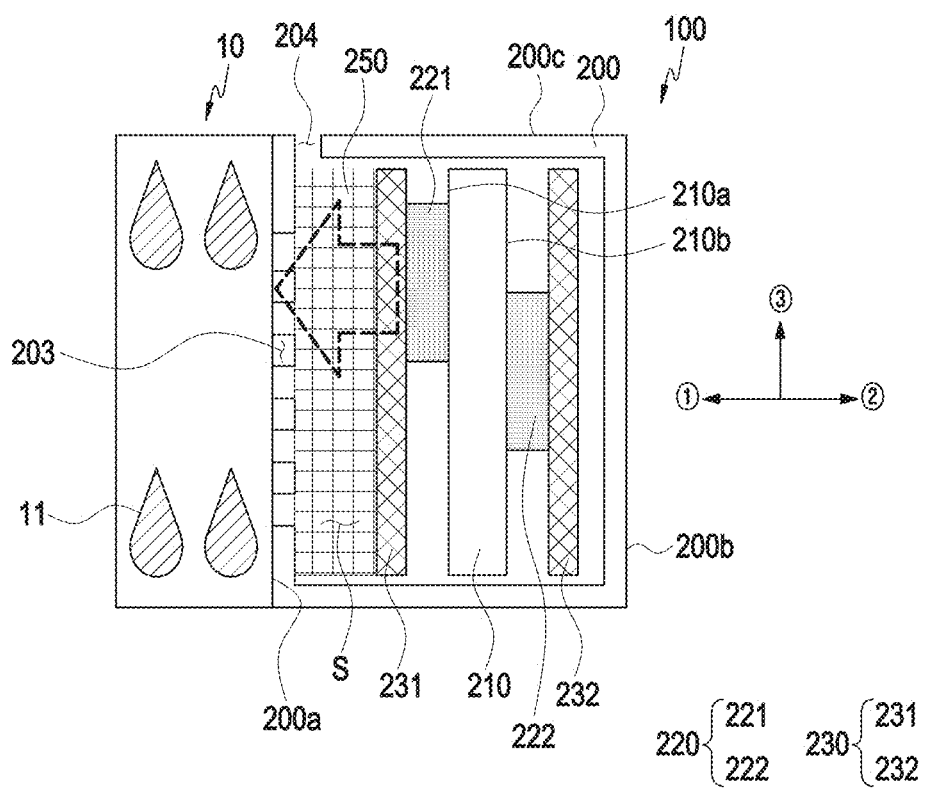
FIG. 6A is a cross-sectional view illustrating an electronic device including a mesh material member, according to various embodiments.

FIG. 6A is a cross-sectional view illustrating an electronic device including a mesh material member 250, according to various embodiments. FIG. 6B is a cross-sectional view illustrating an electronic device further including a heat transfer member 260, according to various embodiments. FIG. 7 is a vapor pressure curve graph according to temperature, according to various embodiments.

Referring to FIG. 6A, a substrate 210 may be disposed inside the housing 200. In addition, an electronic component 220 may be disposed on at least one surface of the substrate 210. According to an embodiment, electronic components 221 and 222 may be respectively disposed on one surface 210a and the other surface 210b of the substrate 210. In addition, a first heat spreading structure 231 may be disposed adjacent to the electronic component 221 disposed on the one surface 210a of the substrate 210, of the electronic components, and a second heat spreading structure 232 may be disposed adjacent to the electronic component 222 disposed on the other surface 210b of the substrate 210 among the electronic devices.

According to various embodiments of the disclosure, the member 250 may be disposed in a space between the heat spreading structure 230 and the housing 200. According to the embodiment illustrated in FIG. 6A, the mesh material member 250 may be disposed in the space S between the first heat spreading structure 230 and the first surface 200a of the housing 200. The member 250 may be disposed on a path through which heat spread through the heat spreading structure 230 moves to radiate heat to the outside through the first surface 200a of the housing 200. As illustrated in FIG. 6A, since the member 250 is disposed adjacent to the first opening 203 formed on the first surface 200a, the sweat 11 discharged from the skin of the user 10 skin may be absorbed by the member 250 as soon as entering the first openings 203 and may also be spread.

According to an embodiment, at least a portion of the member 250 may be adjacent to the first openings 203 of the first surface 200a of the housing 200, and at least another portion may be adjacent to the second openings 204 of third surface 200c of the housing 200. The sweat 11 introduced through the first openings 203 may be absorbed and/or spread into the member 250 and evaporated through the second openings 204.

According to an embodiment, at least a portion of the electronic component 220 disposed on the substrate 210 may be disposed adjacent to the second openings 204. For example, referring to FIG. 6A, unlike disposing the electronic component 222, which is disposed on the other surface 210b of the substrate 210, in the central portion of the substrate 210, the electronic component 221, which is disposed on the one surface 210a of the substrate 210, may be disposed at an edge side of the substrate 210 rather than in the central portion of the substrate 210. For example, the electronic component 221 may be eccentrically disposed adjacent to the second opening 204. According to an embodiment, when the second openings 204 are directed upward in the wearing member 103 (e.g., the direction component ③ in FIG. 2A), the electronic component 221 may be disposed adjacent to the upper surface of the wearing member 103, and when the second openings 204 are directed downward in the wearing member 103 (e.g., the direction component ③ in FIG. 2A), the electronic component 221 may be disposed adjacent to the lower surface of the wearing member 103. When the electronic component 221 is disposed adjacent to the second openings 204 in this way, the heat generated from the electronic component 221 may be intensively transferred to the second openings 204 and dissipated to a position adjacent to the second openings 204. As will be described below, due to the eccentrically disposed structure of the electronic component 221, it is possible to accelerate the evaporating rate of sweat 11 after the sweat 11 is absorbed and/or spread into the member 250.

Figure 6B:
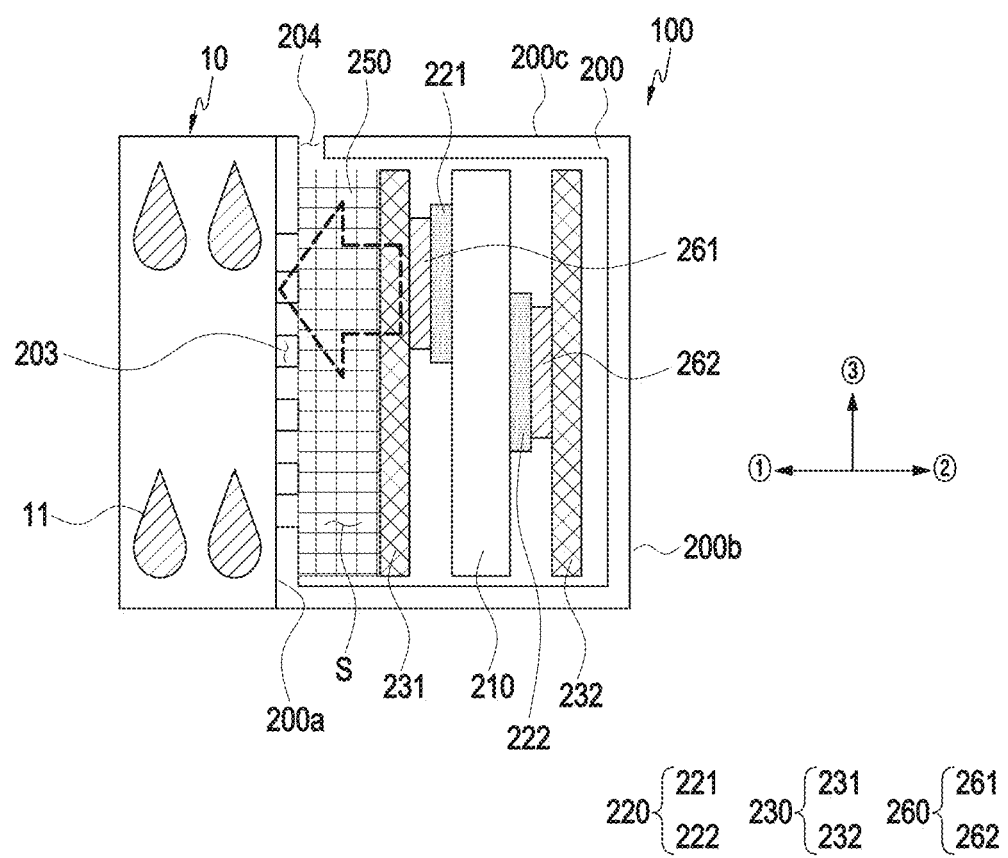
FIG. 6B is a cross-sectional view illustrating an electronic device further including a heat transfer member, according to various embodiments.
Figure 7:
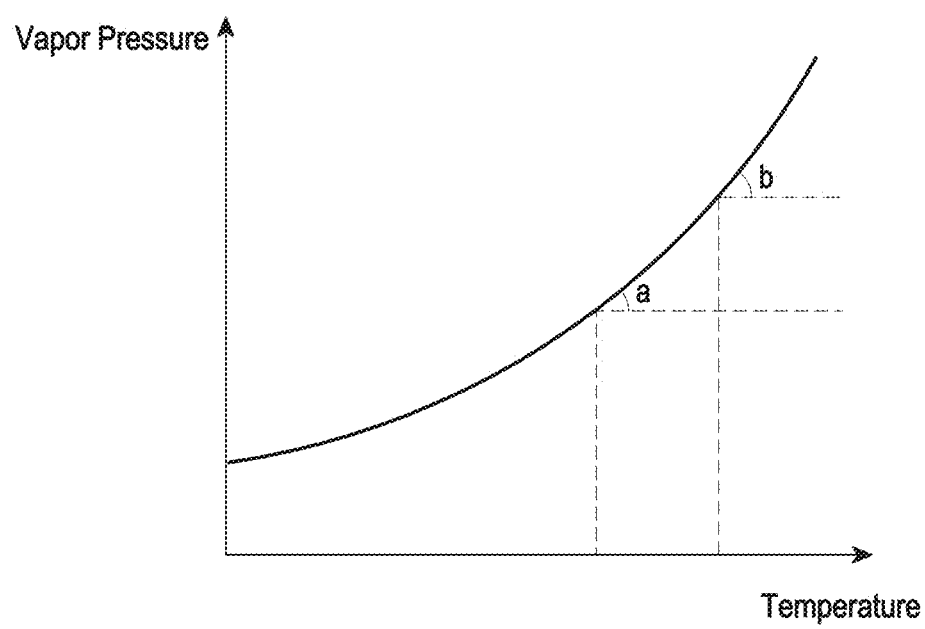
FIG. 7 is a graph illustrating a vapor pressure curve according to temperature, according to various embodiments.

Referring to FIG. 6B, the wearable electronic device 100 may further include a heat transfer member 260. According to an embodiment, the heat transfer member 260 may be disposed between the electronic component 220 and the heat spreading structure 230. According to an embodiment, the heat transfer member 260 may include a first heat transfer member 261 disposed between the first heat spreading structure 231 and the electronic component 221, and a second heat transfer member 262 disposed between the second heat spreading structure 232 and the electronic component 222. The first heat transfer member 261 and the second heat transfer member 262 may be disposed to at least partially overlap the electronic components 221 and 222, respectively. According to various embodiments, the heat transfer member 260 may include a solid or liquid thermal interface material (TIM). The solid or liquid TIM may include a highly heat-conductive material such as graphite, carbon nanotubes, a natural regenerated material, silicon, silicone, or graphite. By providing the heat transfer member 260, the heat generated from the electronic component 220 can be transferred to the heat spreading structure 230 and the surface of the housing 200 more rapidly so that the temperature of the electronic component 220 can be effectively lowered.

Referring to FIG. 7, it can be seen that the vapor pressure also increases when the temperature increases. For example, as the temperature increases, the slope of the vapor pressure curve versus temperature may increase (a→b). That is, it is possible to increase the temperature at the side of the second openings 204 in which the sweat 11 is disposed due to the increase in vapor pressure according to the increase in temperature, whereby it is possible to accelerate the evaporation rate.

FIGS. 8A, 8B, 8C and 8D are diagrams each illustrating movement of a liquid according to a surface state of a mesh material member 250 according to various embodiments. FIGS. 9A, 9B and 9C are diagrams each illustrating a composite mesh material member 250 according to various embodiments.

According to various embodiments of the disclosure, by including the mesh material member 250, it is possible to promote absorption, movement, and evaporation of liquid introduced into the wearable electronic device.

FIGS. 8A, 8B, 8C and 8D illustrate various embodiments in which the moving speed of liquid varies depending on the surface state of a mesh material member 250.

Figure 8A:
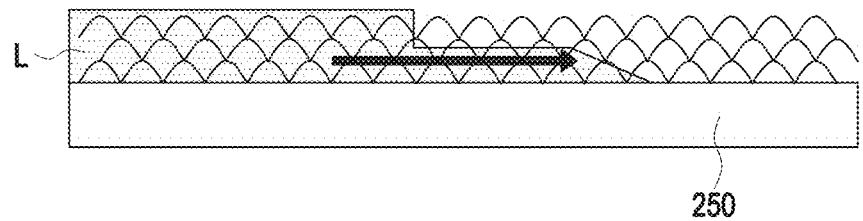
FIGS. 8A, 8B, 8C and 8D are diagrams each illustrating the movement of a liquid according to a surface state of a mesh material member according to various embodiments.
Figures 9A, 9B, 9C:
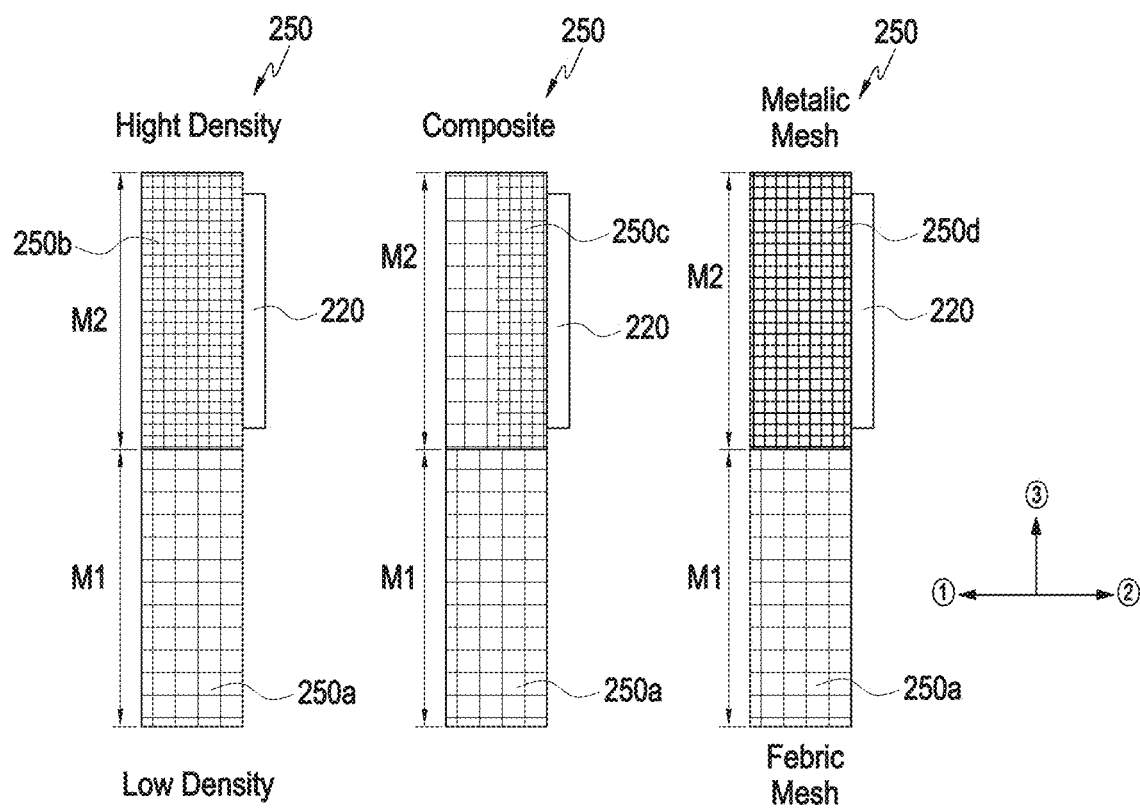
FIGS. 9A, 9B and 9C are diagrams each illustrating a composite mesh material according to various embodiments.

FIG. 8A conceptually illustrates a state in which liquid moves by a capillary force in a mesh material member 250 in the form of a net. The liquid may spread in one direction by a wicking phenomenon.

Figure 8B:
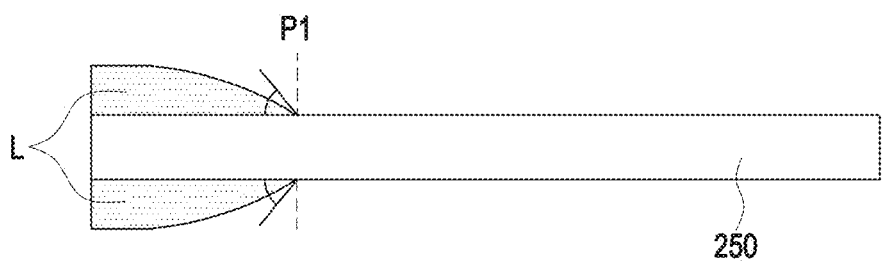
Figure 8C:
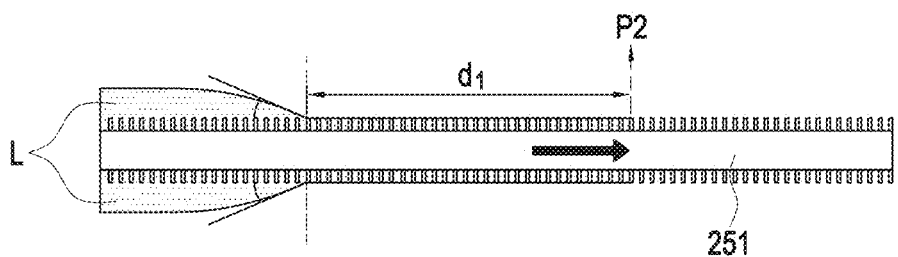
Figure 8D:
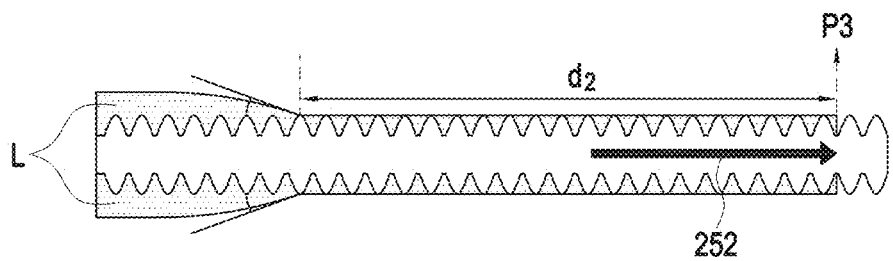

FIG. 8B is a view illustrating the moving speed of liquid in a mesh material member 250 having a general surface, and FIG. 8C is a view illustrating the moving speed of the liquid in a mesh material member 251 having a nanograss surface. In addition, FIG. 8D illustrates the moving speed of liquid in a mesh material member 252 a microcavity surface. The "liquid L" may, for example, be sweat flowing from a user's skin when the user wears the wearable electronic device.

According to various embodiments, under the same environment condition and time condition, when the mesh material member 250 has the general surface, sweat may move to a position P1. When the mesh material member 251 has the nanograss surface, sweat may further move by d1 compared to that in the case in which the mesh material member 251 has the general surface, and may thus move to a position P2. In addition, when the mesh material member 252 has the microcavity surface, sweat may further move by d2 compared to that in the case in which the mesh material member 251 has the general surface, and may thus move to a position P3. As described above, even with the members 250 made of the same mesh material, the moving speed of sweat may be formed differently depending on the surface states of the members 250. As described above, the disclosure may provide various embodiments in which the mesh material member 250 is applied and the surface of the member 250 is formed such that the liquid moves quickly.

FIGS. 9A, 9B and 9C are diagrams each illustrating a composite mesh material member 250 according to various embodiments. FIGS. 10A, 10B, 10C and 10D are diagrams illustrating the moving speeds of liquid depending on various structures of the member 250, according to various embodiments.

Referring to FIGS. 9A, 9B and 9C and FIGS. 10A, 10B, 10C and 10D together, the moving speed of liquid may vary in the member 250 as the density or material of the member 250 varies.

According to various embodiments, the mesh material member 250 may include mesh materials having different densities and separated into at two portions M1 and M2 in a third direction (e.g., the direction component ③). The first portion M1 of the member 250 may be a portion through which liquid (e.g., sweat) is absorbed, and the second portion M2 may be a portion through which the liquid (e.g., sweat) is evaporated. According to an embodiment, by forming the mesh material member 250 using composite mesh materials separated into two or more different portions toward the second openings (e.g., the second openings 204 in FIG. 6A) located in the third direction, it is possible to further accelerate the spreading rate of sweat by the capillary force.

According to various embodiments, as an example, as illustrated in FIG. 9A, the first portion M1 of the composite mesh materials may be formed of a low-density mesh material 250a, and the second portion M2 of the composite mesh materials may be made of a mesh material 250b having a relatively higher density than that of the first portion M1.

According to various embodiments, as another example, as illustrated in FIG. 9B, the first part M1 of the composite mesh materials may be formed of a low-density mesh material 250a, a portion of the second portion M2 of the composite mesh materials may be formed of a mesh material having a low density similar to that of the first portion M1, and the other portion of the second portion M2 of the composite mesh materials may be formed of a mesh material having a relatively higher density than that of the first portion M1. That is, the second portion M2 of FIG. 9C may be formed of a composite mesh material 250c in which a low-density material and a high-density material are mixed with each other. At this time, the low-density portion and the high-density portion of the second portion M2 may be disposed in parallel to each other in the second direction (e.g., the direction component ②), and each of the log-density and high-density portions may extend in the third direction (e.g., the direction component ③) side by side.

Using composite mesh materials, as another example, the composite materials may include two types of mesh materials (hereinafter, referred to as "double-material composite mesh materials") having different heat conductivities in the third direction (e.g., the direction component ③). As illustrated in FIG. 9C, the first portion M1 may be formed of a fabric as a low-density mesh material 250a, and the second portion M2 may be formed of a metallic mesh material 250d.

In general, the diameter of sweat particles is 0.4 nm, and the sizes of raindrops and water droplets are 500 μm to 3000 μm. The optimized diameter of the mesh material member 250 for preventing and/or reducing water droplets from accumulating while absorbing and moving sweat may be 10 nm to 10,000 nm. According to an embodiment, the mesh material of the portion in which sweat is absorbed (e.g., the first portion M1) may be formed to have a density in the range of 100 nm to 10,000 nm, and the mesh material of the portion through which sweat evaporates (e.g., the second portion M2) may be formed to have a density in the range of 10 nm to 100 nm to be dense than the portion in which sweat is absorbed so that the sweat spreading effect by a capillary force can be improved. According to an embodiment, as the mesh material of the portion in which sweat is absorbed (e.g., the first portion M1), a fabric that is a material having a low heat conductivity may be used. And, as the mesh material of the portion through which sweat evaporates (e.g., the second portion M2), a metal that is a material having a high heat conductivity may be used, or a composite mesh material formed by plating a metal metallic material to a fabric material (e.g., Cu/Ni plating) to have an increased heat conductivity may be applied. Thus the evaporation of sweat can be promoted.

In addition, at least one portion 221 of electronic components 220 disposed on the substrate (e.g., the substrate 210 in FIG. 6A) is disposed adjacent to the portion through which sweat evaporates (e.g., the second portion M2) whereby heat energy generated from the electronic component 221 can be more easily discharged to the outside of the electronic device. Using the eccentrically disposed structure of the electronic component 221, it is possible to accelerate the evaporating rate of sweat 11 after the sweat 11 is absorbed and/or spread into the member 250.

FIG. 10A, is a diagram illustrating a non-woven material member 250', and FIG. 10B is a diagram illustrating a member 250 made of a low-density mesh material 250a having a general surface. Compared to FIG. 10A, in the embodiment of FIG. 10B to which the mesh material 250a is applied, it can be seen that the moving speed of liquid (e.g., sweat) is faster. FIG. 10C is a diagram illustrating an embodiment in which a low-density mesh material 250a is applied to the first portion (e.g., the first portion M1 in FIG. 9A), and a high-density mesh material 250b is applied to the second portion (e.g., the second portion M2 in FIG. 9A), and FIG. 10D is a diagram illustrating an embodiment in which a fabric mesh material 250a is applied to the first portion (e.g., the first portion M1 in FIG. 9C) and a metallic mesh material 250d is applied to the second portion (e.g., the second portion M2 in FIG. 9C). It can be seen that the moving speed of liquid (e.g., sweat) is faster in the embodiment of FIG. 10C to which a composite mesh material is applied compared to that in FIG. 10B, and it can be seen that the moving speed of liquid (e.g., sweat) is faster in the embodiment (e.g., FIG. 10D) to which a double-material composite mesh material is applied compared to that in FIG. 10C.

Figure 11A:
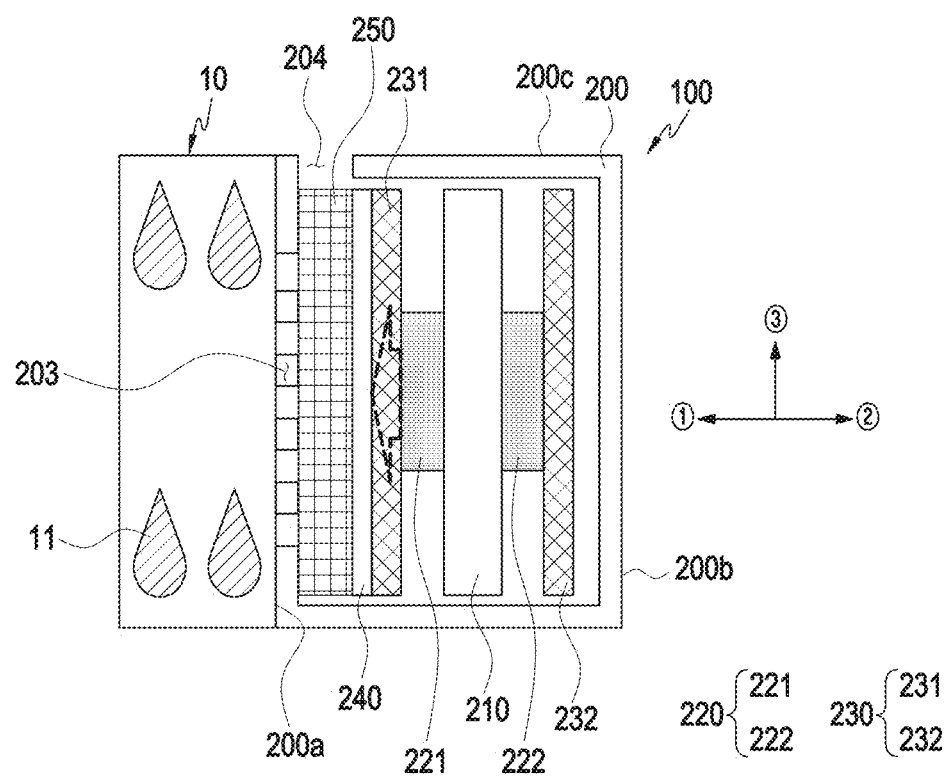
FIG. 11A is a cross-sectional view illustrating an electronic device in which a heat insulating structure and a mesh material are compositely applied, according to various embodiments.
Figure 11B:
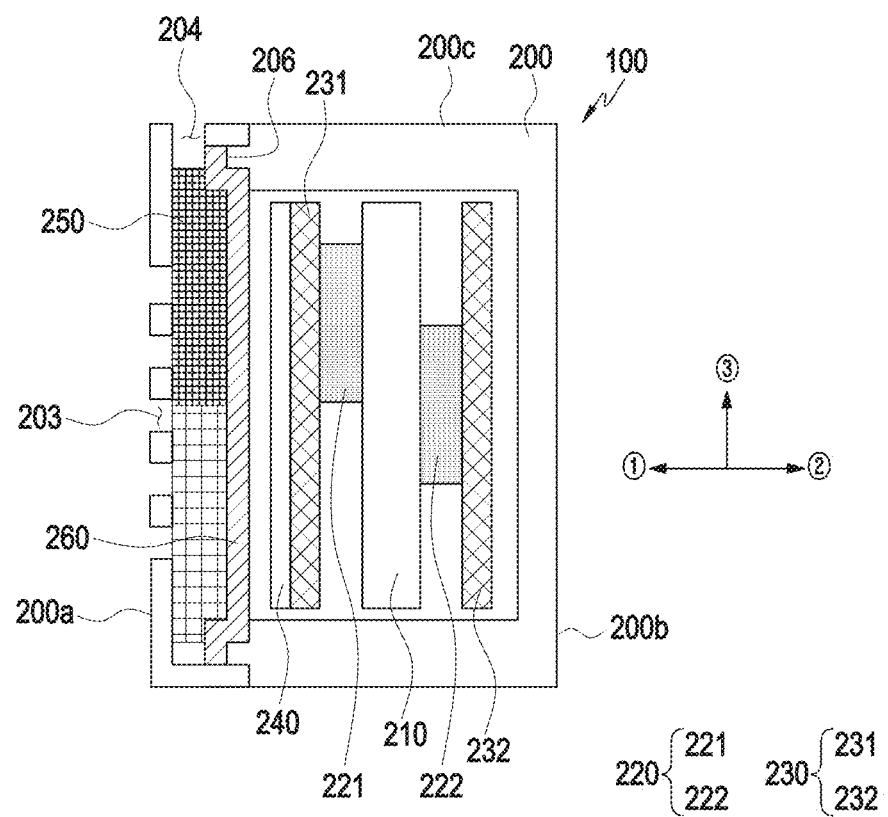
FIG. 11B is a cross-sectional view illustrating an electronic device further including a separation membrane, according to various embodiments.
Figure 12:
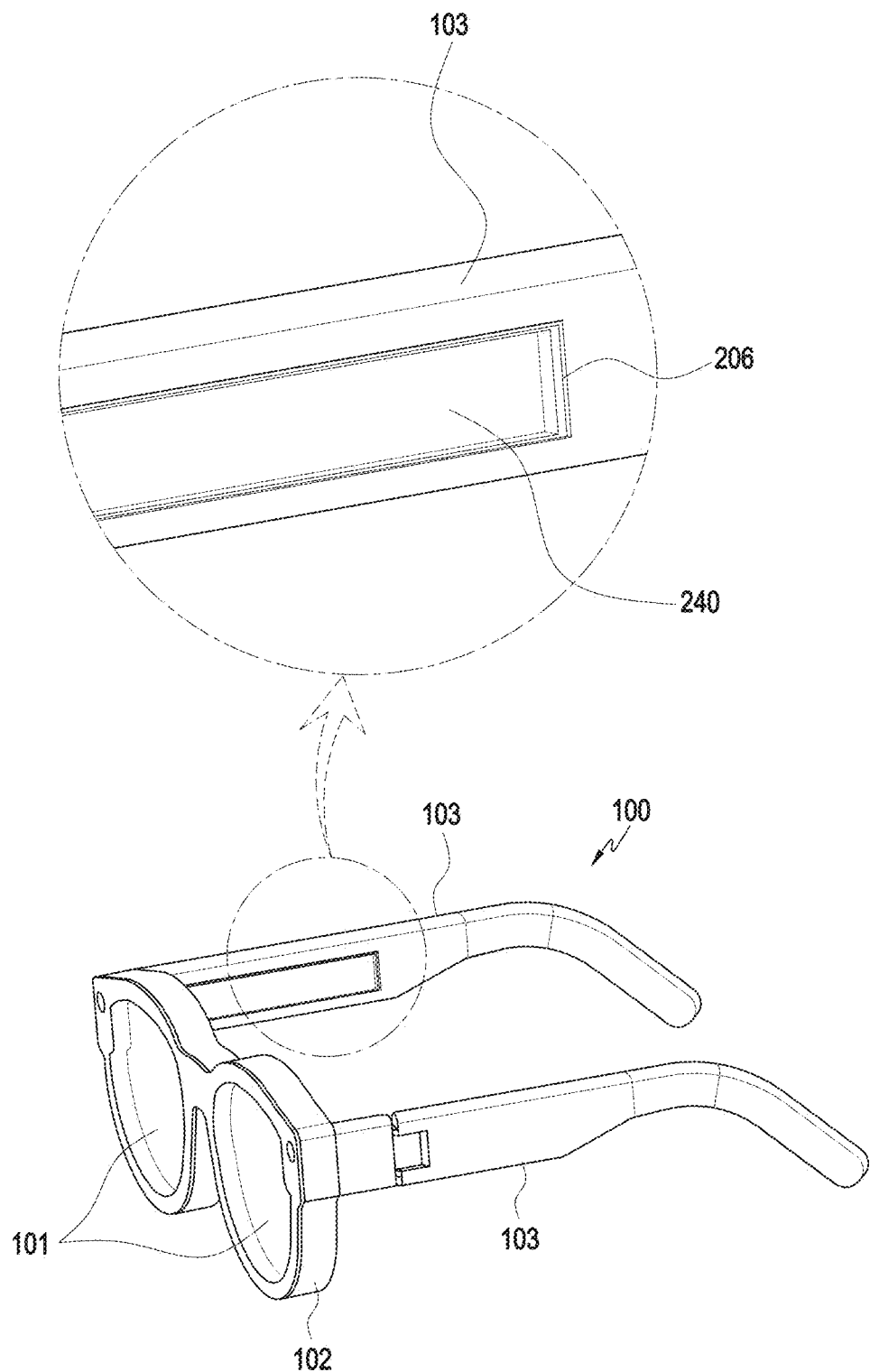
FIG. 12 is an enlarged perspective view illustrating an electronic device further including a separation membrane seating structure, according to various embodiments.

FIG. 11A is a cross-sectional view illustrating an electronic device 100 in which a heat insulating structure and a mesh material are compositely applied, according to various embodiments. FIG. 11B is a cross-sectional view illustrating the electronic device 100 further including a separation membrane 260, according to various embodiments of the disclosure. FIG. 12 is an enlarged perspective view illustrating an electronic device further including a separation membrane seating structure, according to various embodiments.

Referring to FIGS. 11A and 11B, the wearable electronic device 100 may include a housing 200 including a first surface 200a facing in a first direction (e.g., the direction component ①) and facing a portion of a user's body, a second surface 200b facing in a second direction (e.g., the direction component ②) opposite to the first direction, and a third surface 200c facing in a third direction (e.g., the direction component ③) different from the first direction and the second direction and surrounding the internal space between the first surface and the second surface.

The wearable electronic device 100 may include a substrate 210 and an electronic component 220 inside the housing 200, and may further include a heat spreading structure 230 disposed between one surface of the electronic component 220 and the housing 200. In addition, a first opening 203 may be formed in the first surface 200a of the housing 200, and a second opening 204 may be formed in the third surface 200c of the housing 200. In addition, the wearable electronic device 100 may include a mesh material member 250 for absorbing and evaporating sweat according to various embodiments described above with reference to FIGS. 8 to 10, and may further include heat insulating structure 240 disposed between the heat spreading structure and the member. According to an embodiment, the wearable electronic device 100 may include a heat spreading structure 230 to evenly spread heat into the housing 200, and a heat insulating structure 240 may be applied to a surface adjacent to the surface that comes into contact with the skin (e.g., the first surface 200a) to block heat. In addition, by forming the first opening 203 for air circulation and sweat absorption adjacent to the surface of the housing that comes into contact with the skin (e.g., the first surface 200a), and additionally including the second opening 204 for sweat evaporation and the member 250 adjacent thereto, it is possible to improve the user's convenience. In particular, according to an embodiment, as illustrated in FIGS. 11A and 11B, by applying a composite structure including a heat insulating structure 240 and a mesh material member 250 for sweat absorption and evaporation, it is possible to further improve the user's convenience.

According to various embodiments, the wearable electronic device may further include a separation membrane 260 to prevent and/or reduce penetration of moisture, including sweat of the user. The separation membrane 260 is a component made of, for example, a material such as plastic, and may be disposed between the member 250 and the heat insulating structure 240 as illustrated in FIG. 11B.

Referring to FIG. 11B and FIG. 12 together, one surface of the housing 200 may include a separation membrane seating structure 206 for seating the separation membrane 260. According to an embodiment, in the process of assembling a product (e.g., the wearable electronic device 100), the heat radiating structure, and the sweat absorption and evaporation structure may be manufactured through a method of assembling the substrate 210, the electronic component 220, the heat spreading structure 230, and the heat insulating structure 240 as one assembly, seating the separation membrane 260, and then mounting the member 250 on one surface of the membrane 260. Although the drawing illustrates that the housing 200 and the separation membrane 260 are provided as separate components, an embodiment in which the housing 200 and the separation membrane 260 are integrally formed is also applicable.

Figure 13:
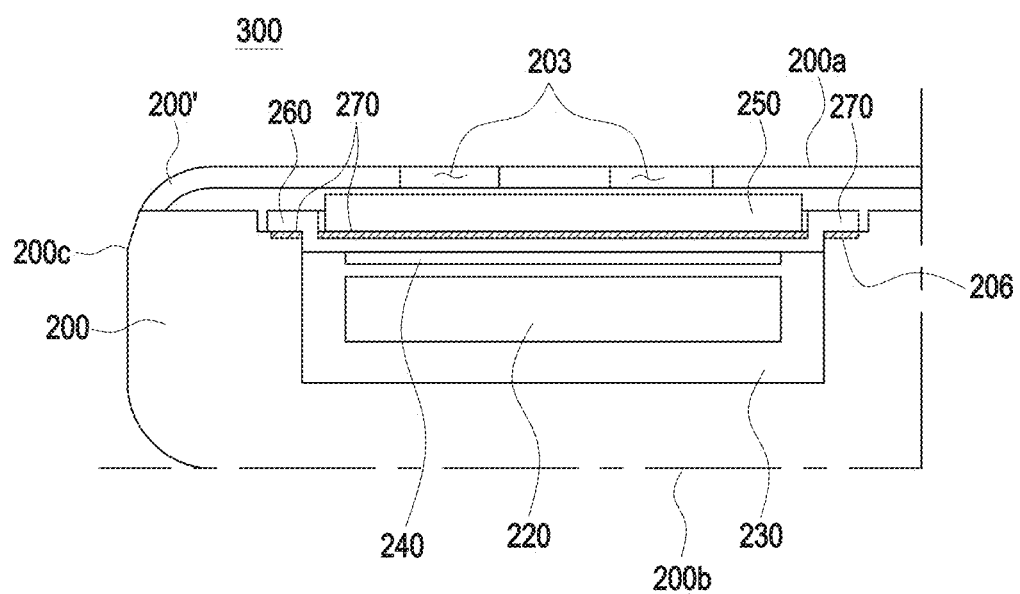
FIG. 13 is a cross-sectional view illustrating an electronic device according to various embodiments.

FIG. 13 is a cross-sectional view illustrating an electronic device 300 according to various embodiments.

The electronic device 300 illustrated in FIG. 13 may be the same as or similar to the electronic device 100 described with reference to FIGS. 1 to 12, but may also refer to another electronic device. For example, the electronic device 300 may be a watch-type wearable electronic device instead of the glasses-type wearable electronic device illustrated in FIGS. 1 to 12. As such, the electronic device to which the above-described various embodiments are applied may not be limited to any specific type and shape.

According to an embodiment, the electronic device 300 may include a housing 200 including a first surface 200a facing in a first direction and facing a portion of a user's body, a second surface 200b facing in a second direction opposite to the first direction, and a third surface 200c facing in a third direction different from the first direction and the second direction and surrounding the internal space between the first surface and the second surface. Meanwhile, a portion of the housing 200 may be configured in the form of a cover 200' that may be coupled to another portion of the housing.

In addition, referring to FIG. 13, the electronic device 300 may include an electronic component 220, and may further include a heat spreading structure 230 disposed between the electronic component 220 and the housing 200 and additionally a heat insulating structure 240 disposed adjacent to the surface that comes into contact with the user's skin (e.g., the first surface 200a). The electronic component 220 may be integrally formed with a substrate not illustrated in the drawing. In addition, the heat spreading structure 230 may be formed to surround two or more surfaces of the electronic component 220. A first opening 203 may be formed in the first surface 200a of the housing 200. According to an embodiment, the first opening 203 may be formed on the cover 200'. In addition, the electronic device 300 may include a mesh material member 250. Here, the member 250 may be disposed at a position adjacent to the first opening 203 to facilitate absorption and evaporation of sweat. In the embodiment illustrated in FIG. 13, the first opening 203 formed in the electronic device 300 may be provided for absorption of liquid (e.g., sweat), but in some cases, may also be used as a passage for evaporation of the liquid (e.g., sweat).

According to various embodiments, the electronic device 300 may further include a separation membrane 260 to prevent and/or reduce penetration of moisture including sweat of a user, and the separation membrane 260 may be mounted on the separation membrane seating structure 206 of the housing 200 to seal a space between the space in which the member 250 is disposed and the space in which the electronic component 220 is disposed. According to an embodiment, the separation membrane 260 may be mounted on the separation membrane seating structure 206 using, for example, a highly thermal-conductive waterproof tape 270.

Figure 14A:
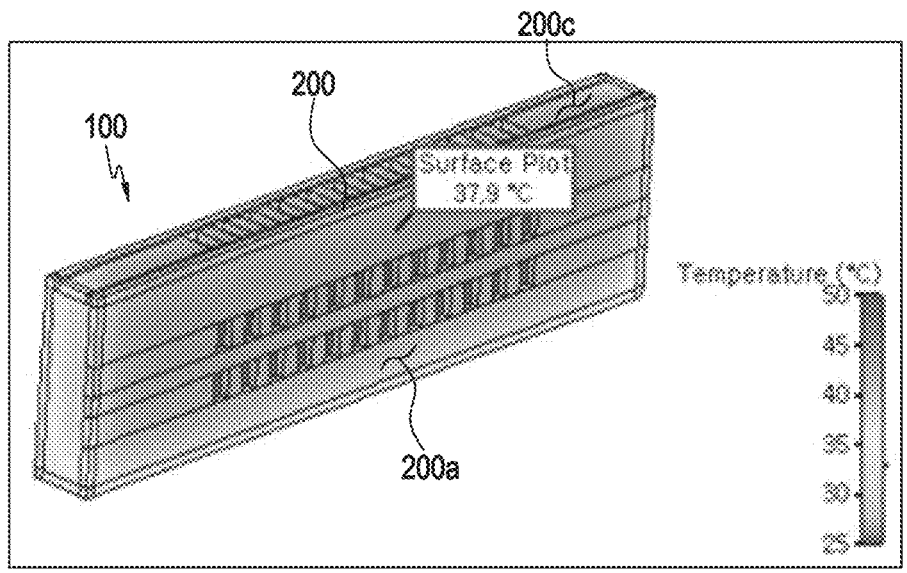
FIG. 14A is a diagram illustrating the surface temperature of an electronic device in which a composite structure including a heat insulating structure a mesh material is not applied, according to various embodiments.
Figure 14B:
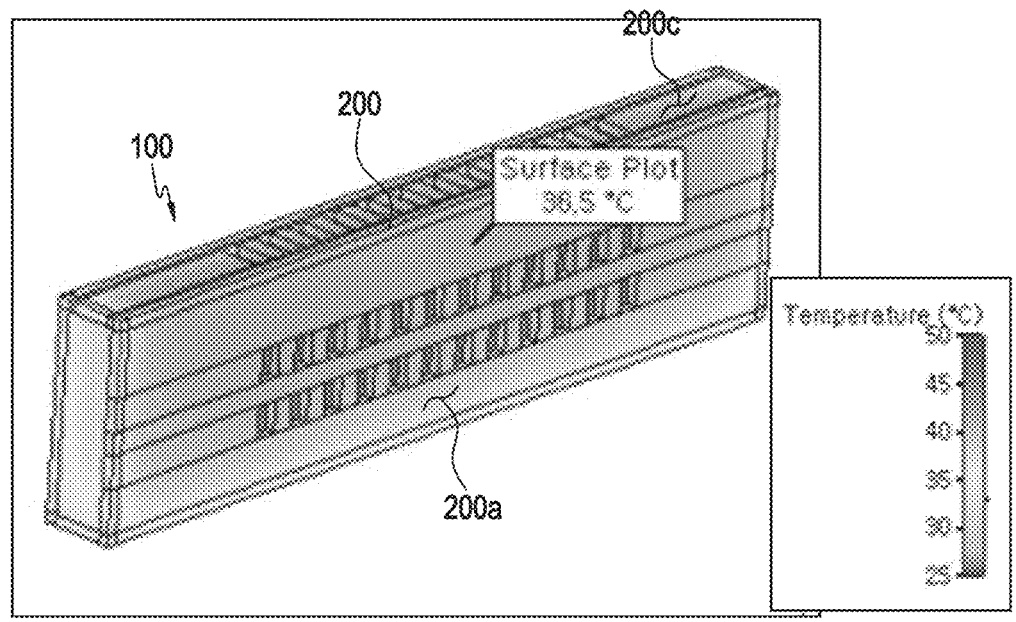
FIG. 14B is a diagram illustrating the surface temperature of an electronic device in which a composite structure including a heat insulating structure a mesh material is applied, according to various embodiments.

FIG. 14A is a diagram illustrating the surface temperature of an electronic device in which a composite structure including a heat insulating structure a mesh material is not applied, according to various embodiments. FIG. 14B is a diagram illustrating the surface temperature of an electronic device in which a composite structure including a heat insulating structure and a mesh material is applied, according to various embodiments.

Referring to FIG. 14A, in the electronic device 100 to which the composite structure including the heat insulating structure and the mesh material is not applied, the surface temperature of the surface 200a, which comes into contact with the skin, may be measured as 37.9 degrees Celsius. Referring to FIG. 14B, in the electronic device 100 to which the composite structure including the heat insulating structure and the mesh material is applied, the surface temperature of the surface 200a, which comes into contact with the skin, may be measured as 36.5 degrees Celsius. That is, according to various embodiments of the disclosure, since the temperature measured on a side surface portion of the electronic device 100 can be reduced by about 1 degree Celsius or more, there may be an advantage in that it is possible to reduce the user's inconvenience due to contact with high-temperature heat energy in using the electronic device.

According to an embodiment, a method according to various embodiments disclosed herein may be included and provided in a computer program product. The computer program product may be traded as a product between a seller and a purchaser. The computer program product may be distributed in the form of a machine-readable storage medium (e.g., a compact disc read only memory (CD-ROM)), or may be distributed through an application store (e.g., Play Store™), directly between two user devices (e.g., smartphones), or online (e.g., downloaded or uploaded). In the case of online distribution, at least a part of the computer program product may be temporarily stored in or temporarily produced from a machine-readable storage medium such as a manufacturer's server, a server of an application store, or memory of a relay server.

According to various embodiments, each (e.g., a module or a program) of the above-described components may include one or more entities. According to various embodiments, one or more of the components or operations described above may be omitted, or one or more other components or operations may be added. Alternatively or additionally, a plurality of components (e.g., modules or programs) may be integrated into one component. In such a case, an integrated component may perform one or more functions of each of the plurality of components in the same or similar manner as when performed by the corresponding one of the plurality of components prior to the integration. According to various embodiments, operations performed by a module, a program, or other components may be performed sequentially, in parallel, repetitively, or heuristically, one or more of the operations may be performed in a different order or omitted, or one or more other operations may be added thereto.

According to an embodiment of the disclosure, it is possible to provide an electronic device (e.g., the electronic device 100 of FIG. 6A) including: a housing (e.g., the housing 200 in FIG. 6A) including a first surface (e.g., the first surface 200a in FIG. 6A) facing a first direction, a second surface (e.g., the second surface 200b in FIG. 6A) facing a second direction opposite to the first direction, and a third surface (e.g., the third surface 200c in FIG. 6A) enclosing an internal space between the first surface and the second surface, wherein at least one portion of the third surface faces a third direction different from the first direction and the second direction, wherein a first opening (e.g., the first opening 203 in FIG. 6A) is formed in the first surface, and a second opening (e.g., the second opening 204 in FIG. 6A) is formed in the third surface; a substrate (e.g., the substrate 210 in FIG. 6A) disposed in the internal space; an electronic component (e.g., the electronic component 220 in FIG. 6A) disposed on at least one surface of the substrate; and a mesh member (e.g., the member 250 in FIG. 6A) disposed in the internal space adjacent to the first opening and the second opening.

According to an embodiment, the mesh member may include mesh materials separated into at least two portions having different densities in the third direction.

According to an embodiment, the mesh member may include the mesh materials of a low-density portion and a high-density portion (e.g., the mesh materials 250a and 250b or 250a and 250c in FIG. 9A or 9B) sequentially disposed in the third direction.

According to an embodiment, the mesh member may include at least two types of mesh materials having different heat conductivities in the third direction.

According to an embodiment, the mesh member may include a fabric mesh material and a metallic mesh material (e.g., the mesh materials 250a and 250d in FIG. 9C) may be sequentially disposed in the third direction.

According to an embodiment, the mesh member may include a nanograss or microcavity type mesh material.

According to an embodiment, the electronic device may further include a heat spreading structure (e.g., the heat spreading structure 230 of FIG. 6A) disposed between the electronic component and the mesh material member.

According to an embodiment, the electronic device may further include a heat insulating structure comprising heat insulating material (e.g., the heat insulating structure 240 in FIG. 11A) disposed between the heat spreading structure and the mesh material member.

According to an embodiment, the electronic device may further include a separation membrane (e.g., the separation membrane 260 in FIG. 11B) disposed between the member and the electronic component configured to reduce moisture from penetrating into the electronic component.

According to an embodiment, the housing may further include a separation membrane seating structure (e.g., the separation membrane seating structure 206 in FIG. 11B).

According to an embodiment, a heat-conductive waterproof tape (e.g., the highly heat-conductive waterproof tape of FIG. 12) may be attached adjacent to the separation membrane.

According to an embodiment, the electronic component may be disposed at a position adjacent to the second opening.

According to an embodiment, the electronic device may be a wearable electronic device (e.g., smartglasses, smartwatch, earbuds) capable of being worn on a portion of a user's body.

According to an embodiment, a first recess (e.g., the first recess 201 in FIG. 4B) having a specified depth may be formed in an outer surface of the first surface.

According to an embodiment, a second recess (e.g., the second recess 202 in FIG. 5B) having a specified depth may be formed in an inner surface of the first surface.

According to an embodiment of the disclosure, it is possible to provide a wearable electronic device (e.g., the wearable electronic device 100 in FIG. 9A) including: a housing (e.g., the housing 200 in FIG. 11A) including a first surface (e.g., the first surface 200a of FIG. 11A) facing a first direction and facing a portion of a user's body, a second surface (e.g., the second surface 200b in FIG. 11A) facing a second direction opposite to the first direction, and a third surface (e.g., the third surface 200c in FIG. 11A) enclosing an internal space between the first surface and the second surface, wherein at least one portion of the third surface faces a third direction different from the first direction and the second direction, wherein a first opening (e.g., the first opening 203 in FIG. 11A) is formed in the first surface, and a second opening (e.g., the second opening 204 in FIG. 11A) is formed in the third surface; a substrate (e.g., the substrate 210 in FIG. 11A) disposed in the internal space; an electronic component (e.g., the electronic component 220 in FIG. 11A) disposed on at least one surface of the substrate; a heat spreading structure (e.g., the heat spreading structure 230 in FIG. 11A) disposed between the electronic component and the member; a mesh member (e.g., the member 250 in FIG. 11A) disposed in the internal space and adjacent to the first opening and the second opening configured to spread moisture to the second opening based on the moisture being introduced from the first opening; and a separation membrane (e.g., the separation membrane 260 in FIG. 11A) disposed between the mesh member and the electronic component configured to reduce moisture from penetrating into the electronic component.

According to an embodiment, the mesh member may include a composite mesh material (e.g., the composite mesh materials 250a and 250b, or 250a and 250c, or 250a and 250d in FIG. 9A to 9C) comprising a combination of at least two materials.

According to an embodiment, the wearable electronic device may further include a heat insulating structure comprising a heat insulating material disposed between the heat spreading structure and the mesh member.

According to an embodiment of the disclosure, it is possible to provide a wearable electronic device including: a housing (e.g., the housing 200 in FIG. 6A) including at least one opening (e.g., the first opening 203 in FIG. 6A); a substrate (e.g., the substrate 210 in FIG. 6A); an electronic component (e.g., the electronic component 220 in FIG. 6A) disposed on at least one surface of the substrate; a heat spreading structure (e.g., the heat spreading structure 230 in FIG. 6A) disposed adjacent to the electronic component (heat generating component); and a mesh member disposed adjacent the opening, and wherein the mesh member is configured to absorb and spread (e.g., the sweat absorbing and spreading member 250 in FIG. 6A).

According to an embodiment, the mesh member may include a composite mesh material (e.g., the composite mesh materials 250a and 250b, or 250a and 250c, or 250a and 250d in FIG. 9A to FIG. 9C) comprising a combination of at least two materials.

While the disclosure has been illustrated and described with reference to various example embodiments, it will be understood that the various example embodiments are intended to be illustrative, not limiting. It will be further understood to those skilled in the art, that a heat radiating member according to various example embodiments and an electronic device including the same are not limited by the above-described embodiments and drawings, and can be variously substituted, modified, and changed within the technical scope of the disclosure. It will also be understood that any of the embodiment(s) described herein may be used in conjunction with any other embodiment(s) described herein.

What is claimed is:

1. An electronic device comprising:
a housing including a first surface facing in a first direction, a second surface facing in a second direction opposite to the first direction, and a third surface enclosing an internal space between the first surface and the second surface, wherein at least one portion of the third surface faces in a third direction different from the first direction and the second direction, wherein a first opening is formed in the first surface, and a second opening is formed in the third surface;
a substrate disposed in the internal space;
an electronic component disposed on at least one surface of the substrate; and
a member disposed in the internal space and including a mesh material disposed adjacent to the first opening and the second opening.

2. The electronic device of claim 1, wherein the member includes mesh materials separated into at least two portions having different densities in the third direction.

3. The electronic device of claim 2, wherein the member includes mesh materials of a low-density portion and a high-density portion that are sequentially disposed in the third direction.

4. The electronic device of claim 1, wherein the member includes at least two types of mesh materials having different heat conductivities in the third direction.

5. The electronic device of claim 4, wherein the member includes a fabric mesh material and a metallic mesh material which are sequentially disposed in the third direction.

6. The electronic device of claim 1, wherein the member includes a nanograss or microcavity type mesh material.

7. The electronic device of claim 1, further comprising:
a heat spreading structure disposed between the electronic component and the member.

8. The electronic device of claim 7, further comprising:
a heat insulating structure disposed between the heat spreading structure and the member.

9. The electronic device of claim 1, further comprising:
a separation membrane disposed between the member and the electronic component to prevent penetration of moisture into the electronic component.

10. The electronic device of claim 9, wherein the housing further includes a separation membrane seating structure.

11. The electronic device of claim 9, wherein a highly heat-conductive waterproof tape is attached adjacent to the separation membrane.

12. The electronic device of claim 9, wherein the electronic component is disposed at a position adjacent to the second opening.

13. The electronic device of claim 1, wherein the electronic device is a wearable electronic device that is capable of being worn on a portion of a user's body.

14. The electronic device of claim 1, wherein a first recess having a predetermined depth is formed in an outer surface of the first surface.

15. The electronic device of claim 1, wherein a second recess having a predetermined depth is formed in an inner surface of the first surface.

16. A wearable electronic device comprising:
a housing including a first surface facing in a first direction and facing a portion of a user's body, a second surface facing in a second direction opposite to the first direction, and a third surface enclosing an internal space between the first surface and the second surface, wherein at least one portion of the third surface faces in a third direction different from the first direction and the second direction, wherein a first opening is formed in the first surface, and a second opening is formed in the third surface;
a substrate disposed in the internal space;
an electronic component disposed on at least one surface of the substrate;
a heat spreading structure disposed between the electronic component and the housing;
a member disposed in the internal space and adjacent to the first opening and the second opening and including a mesh material configured to spread moisture to the second opening when the moisture is introduced from the first opening; and a separation membrane disposed between the member and the electronic component to prevent penetration of moisture into the electronic component.

17. The electronic device of claim 16, wherein the member includes a composite mesh material comprising a combination of at least two materials.

18. The electronic device of claim 16, further comprising:

a heat insulating structure disposed between the heat spreading structure and the member.

19. A wearable electronic device comprising:

a housing including a first surface facing in a first direction and facing a portion of a user's body, a second surface facing in a second direction opposite to the first direction, and a third surface enclosing an internal space between the first surface and the second surface, wherein at least one portion of the third surface faces in a third direction different from the first direction and the second direction, wherein a first opening is formed in the first surface, and a second opening is formed in the third surface;

a substrate;

an electronic component disposed on at least one surface of the substrate;

a heat spreading structure disposed adjacent to the electronic component; and a member disposed adjacent to the first opening and the second opening and including a mesh material configured to spread moisture to the second opening when the moisture is introduced from the first opening.

20. The electronic device of claim 19, wherein the member includes a composite mesh material comprising a combination of at least two materials.

* * * * *